(12) United States Patent
Reynolds et al.

(10) Patent No.: US 11,891,123 B2
(45) Date of Patent: Feb. 6, 2024

(54) UTILITY TERRAIN VEHICLE (UTV) STEERING RACK SUPPORT ASSEMBLY

(71) Applicant: Sandcraft LLC, Phoenix, AZ (US)

(72) Inventors: Brent G Reynolds, Peoria, AZ (US); Jonathan D. Roberts, Peoria, AZ (US)

(73) Assignee: Sandcraft LLC, Phoenix, AZ (US)

( * ) Notice: Subject to any disclaimer, the term of this patent is extended or adjusted under 35 U.S.C. 154(b) by 0 days.

(21) Appl. No.: 17/502,866

(22) Filed: Oct. 15, 2021

(65) Prior Publication Data

US 2022/0119032 A1  Apr. 21, 2022

Related U.S. Application Data

(60) Provisional application No. 63/093,112, filed on Oct. 16, 2020.

(51) Int. Cl.
| | |
|---|---|
| *B62D 3/12* | (2006.01) |
| *B62D 7/16* | (2006.01) |
| *B62D 9/00* | (2006.01) |
| *F16H 19/04* | (2006.01) |

(52) U.S. Cl.
CPC ............. *B62D 3/12* (2013.01); *B62D 7/163* (2013.01); *B60G 2200/314* (2013.01); *B60G 2200/44* (2013.01); *F16H 19/04* (2013.01)

(58) Field of Classification Search
CPC . B62D 3/12; B62D 7/163; B62D 9/00; B60G 2200/314; B60G 2200/44; F16H 19/04
See application file for complete search history.

(56) References Cited

U.S. PATENT DOCUMENTS

| | | | |
|---|---|---|---|
| 4,652,011 A | 3/1987 | Hollerweger et al. | |
| 5,975,573 A | 11/1999 | Belleau | |
| 7,841,606 B2 | 11/2010 | Rey | |
| 8,201,656 B2 | 6/2012 | Archer et al. | |
| 8,454,039 B2 | 6/2013 | Murakami | |
| 8,864,153 B2* | 10/2014 | Luttinen | B60G 3/20 |
| | | | 280/124.109 |
| 9,193,377 B2 | 11/2015 | Pavuk et al. | |
| 9,783,224 B1* | 10/2017 | Roberts | B62D 9/00 |
| 10,556,615 B1* | 2/2020 | Smith | B62D 1/20 |

(Continued)

FOREIGN PATENT DOCUMENTS

WO    WO2016080480 A1    5/2016

*Primary Examiner* — Karen Beck
*Assistant Examiner* — Daniel M. Keck
(74) *Attorney, Agent, or Firm* — BOOTH UDALL FULLER, PLC; Pacer K. Udall; Bryce W. Burnham

(57) ABSTRACT

A steering rack support assembly with a support shaft and a sleeve. The support shaft has a first end, a second end, and at least two mounting members. The cross section of the support shaft may be substantially the same along the length of the support shaft. A first of the at least two mounting members may be affixed to the first end of the support shaft, while a second of the at least two mounting members may be affixed to the second end. Each of the at least two mounting members may be configured to couple to the frame of the vehicle. The sleeve is disposed around an outer surface of the support shaft and is slidably coupled to the support shaft. A bracket affixed to the sleeve may be configured to couple to a rack and pinion assembly, a first tie rod, and a second tie rod.

20 Claims, 26 Drawing Sheets

(56) References Cited

U.S. PATENT DOCUMENTS

| | | | |
|---|---|---|---|
| 2005/0173883 A1* | 8/2005 | Mayenburg | B60G 9/003 |
| | | | 280/124.107 |
| 2010/0289238 A1* | 11/2010 | Archer | B62D 3/12 |
| | | | 280/93.514 |
| 2012/0248724 A1 | 10/2012 | Watanabe et al. | |
| 2015/0197273 A1* | 7/2015 | Schroeder | B62D 3/126 |
| | | | 74/422 |
| 2016/0347350 A1* | 12/2016 | Heon | B60G 13/001 |
| 2019/0126969 A1* | 5/2019 | Scheuerell | F16H 19/04 |

* cited by examiner

114

UTILITY TERRAIN VEHICLE (UTV) STEERING RACK SUPPORT ASSEMBLY

CROSS REFERENCE TO RELATED APPLICATIONS

This application claims the benefit of the filing date of U.S. Provisional Patent Application 63/093,112 entitled "STEERING RACK ASSEMBLY" to Reynolds, et. al. that was filed on Oct. 16, 2020, the disclosure of which is hereby incorporated herein by this reference.

TECHNICAL FIELD

Aspects of this document relate generally to a UTV steering rack support assembly.

BACKGROUND

The stock steering assembly of certain recreational and off-highway vehicles may prove to have insufficient strength for some off-road enthusiasts. Side-by-side recreational and utility vehicles are increasingly popular, but stock rack and pinion steering assemblies on these vehicles can be too weak to withstand the heavy abuse from rugged terrain and rigorous driving, which can lead to premature failure in the stock steering assembly. A need exists for an improved steering assembly for off-road vehicles that provides increased strength and durability.

SUMMARY

Aspects of this document relate to a steering rack support assembly, comprising a support shaft having a first end, a second end, and at least two mounting members, wherein a cross section of the support shaft is substantially the same along a length of the support shaft extending between the first end and the second end and wherein a first of the at least two mounting members is affixed to the first end of the support shaft, a second of the at least two mounting members is affixed to the second end of the support shaft, and each of the at least two mounting members is configured to couple to a frame of a vehicle, and a sleeve disposed around an outer surface of the support shaft and slidably coupled to the support shaft, the sleeve having an aftermarket bracket affixed to the sleeve, the bracket configured to couple to a rack and pinion assembly, a first tie rod, and a second tie rod, wherein when the steering rack support assembly is coupled to the rack and pinion assembly, the first tie rod and the second tie rod are configured to change a selected direction of motion of the vehicle in response to movement of the sleeve along the support shaft.

Particular embodiments may comprise one or more of the following features. The steering rack support assembly may further comprise the rack and pinion assembly, the first tie rod, and the second tie rod, wherein the at least two mounting members are configured to directly attach to the rack and pinion assembly. The at least two mounting members may be configured to directly attach to a sway bar of the vehicle. The at least two mounting members may be configured to directly attach to the frame of the vehicle. The cross section of the support shaft may be circular. The cross section of the support shaft may be rectangular.

Aspects of this document relate to a steering rack support assembly, comprising a support shaft having a first end, a second end, and at least one mounting member, wherein a cross section of the support shaft is substantially the same along a length of the support shaft extending between the first end and the second end and wherein the at least one mounting member is configured to couple to a frame of a vehicle, and a sleeve slidably coupled to the support shaft, the sleeve having a bracket affixed to the sleeve, the bracket configured to couple to a rack and pinion assembly, a first tie rod, and a second tie rod, wherein when the steering rack support assembly is coupled to the rack and pinion assembly, the first tie rod and the second tie rod are configured to change a selected direction of motion of the vehicle in response to movement of the sleeve along the support shaft.

Particular embodiments may comprise one or more of the following features. The steering rack support assembly may further comprise the rack and pinion assembly, the first tie rod, and the second tie rod, wherein the at least two mounting members are configured to directly attach to the rack and pinion assembly. The at least two mounting members may be configured to directly attach to a sway bar of the vehicle. The at least two mounting members may be configured to directly attach to the frame of the vehicle. The cross section of the support shaft may be circular. The cross section of the support shaft may be rectangular. The cross section of the support shaft may be elliptical.

Aspects of this document relate to a steering rack support assembly, comprising a support shaft having a first end, a second end, and at least one mounting member, wherein the at least one mounting member is configured to couple to a frame of a vehicle, and a sleeve disposed around an outer surface of the support shaft and slidably coupled to the support shaft, the sleeve having a bracket affixed to the sleeve, the bracket configured to couple to a rack and pinion assembly, a first tie rod, and a second tie rod, wherein when the steering rack support assembly is coupled to the rack and pinion assembly, the first tie rod and the second tie rod are configured to change a selected direction of motion of the vehicle in response to movement of the sleeve along the support shaft.

Particular embodiments may comprise one or more of the following features. The steering rack support assembly may further comprise the rack and pinion assembly, the first tie rod, and the second tie rod, wherein the at least two mounting members are configured to directly attach to the rack and pinion assembly. The at least two mounting members may be configured to directly attach to a sway bar of the vehicle. The at least two mounting members may be configured to directly attach to the frame of the vehicle. The cross section of the support shaft may be circular. The cross section of the support shaft may be rectangular. The cross section of the support shaft may be elliptical.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1A:
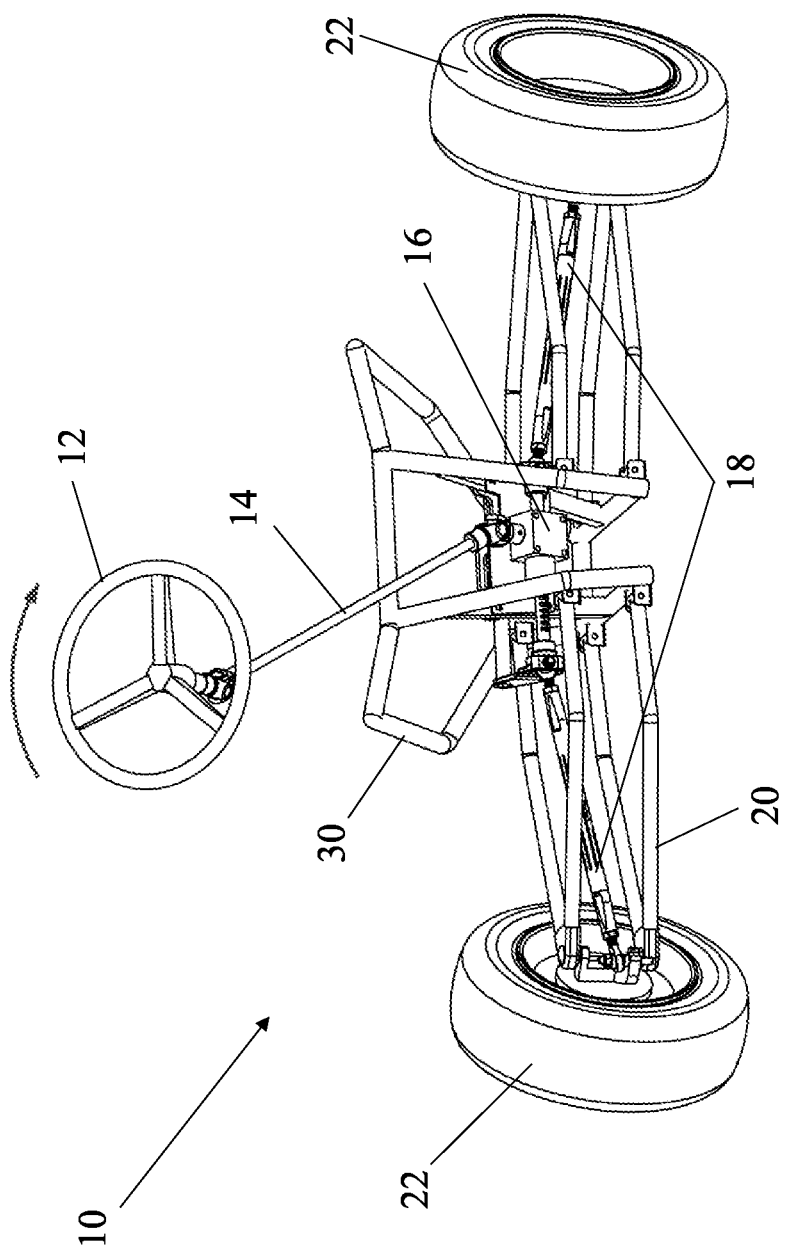
FIGS. 1A and 1B are partial views of a vehicle steering system looking from a rear or midsection of the vehicle towards a front of the vehicle.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure relates to a steering rack support assembly 100 that is configured to provide additional support to the steering assembly 10 of the vehicle and reduce premature failure of the steering assembly 10. The steering rack support assembly 100 may be used on a vehicle including but not limited to: an allterrain vehicle ("ATV"), an offhighway vehicle ("OHV"), an offroad vehicle ("ORV"), a utility task vehicle ("UTV"), a recreational offhighway vehicle ("ROV"), a sidebyside UTV or ROV, a quad, a quad bike, a fourwheeler, a snowmobile, a dune buggy, or the like, (hereinafter collectively referred to as a "UTV"). In certain implementations, the steering rack support assembly 100 is used in a vehicle that may experience high stresses or be driven with less care than normal, such as: golf carts, farm or ranch vehicles, construction vehicles, rental cars, commercial vehicles, go-carts, racing vehicles, mid- or light duty snowplows, or other vehicles that encounter rugged terrain and/or abusive driving habits. In some implementations, the steering rack support assembly 100 is used on a side-by-side UTV or ROV vehicle such as: a Polaris® RZR®, a Polaris® Ranger®, a Kawasaki® Mule™, Arctic Cat®Wildcat™, Arctic Cat® Prowler®, Can-Am® Maverick®, Can-Am® Maverick® X3, Yamaha® YXZ1000R®, Yamaha® Wolverine®, or other similar ROV or UTV vehicles currently existing or yet to be developed.

Figure 1B:
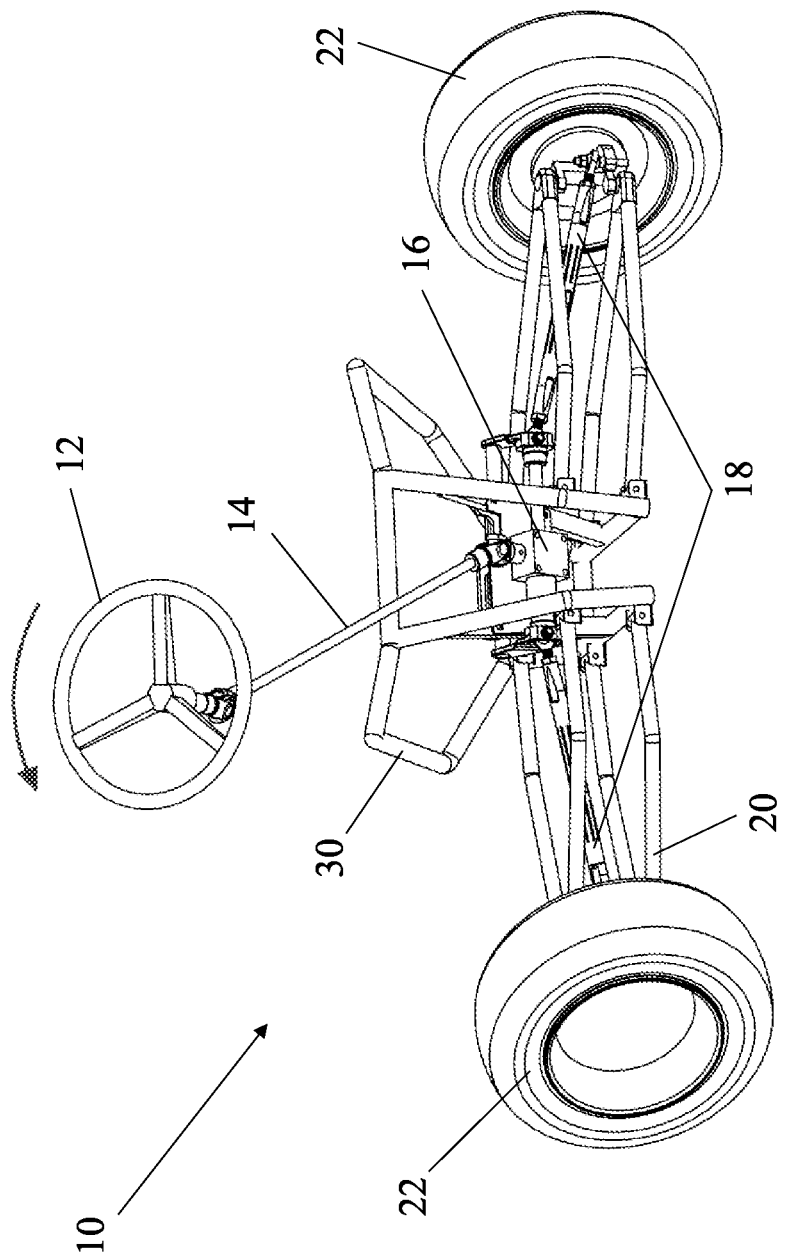

As shown in FIGS. 1A and 1B, the steering rack support assembly 100 is installed on a frame 30 of the vehicle to support the steering assembly 10. The steering assembly 10 includes a steering wheel 12, a steering shaft 14, a rack and pinion assembly 16, a plurality of tie rods 18, a suspension assembly 20, and wheels 22. The wheels 22 are attached to the suspension assembly 20, which may be a double A-arm suspension, as shown, or a double wishbone suspension. The suspension assembly 20 is attached to the frame 30 of the vehicle. The steering wheel 12 operatively couples with the rack and pinion assembly 16 through the steering shaft 14. The steering assembly 10 is configured to change the direction of the vehicle when the vehicle is in motion. For example, as shown in FIG. 1A, when the steering wheel 12 is turned to the right, the steering assembly 10 turns the wheels 22 to the right so that the selected direction of motion of the vehicle is changed. Similarly, as shown in FIG. 1B, when the steering wheel 12 is turned to the left, the steering assembly 10 turns the wheels 22 to the left.

Figure 1C:
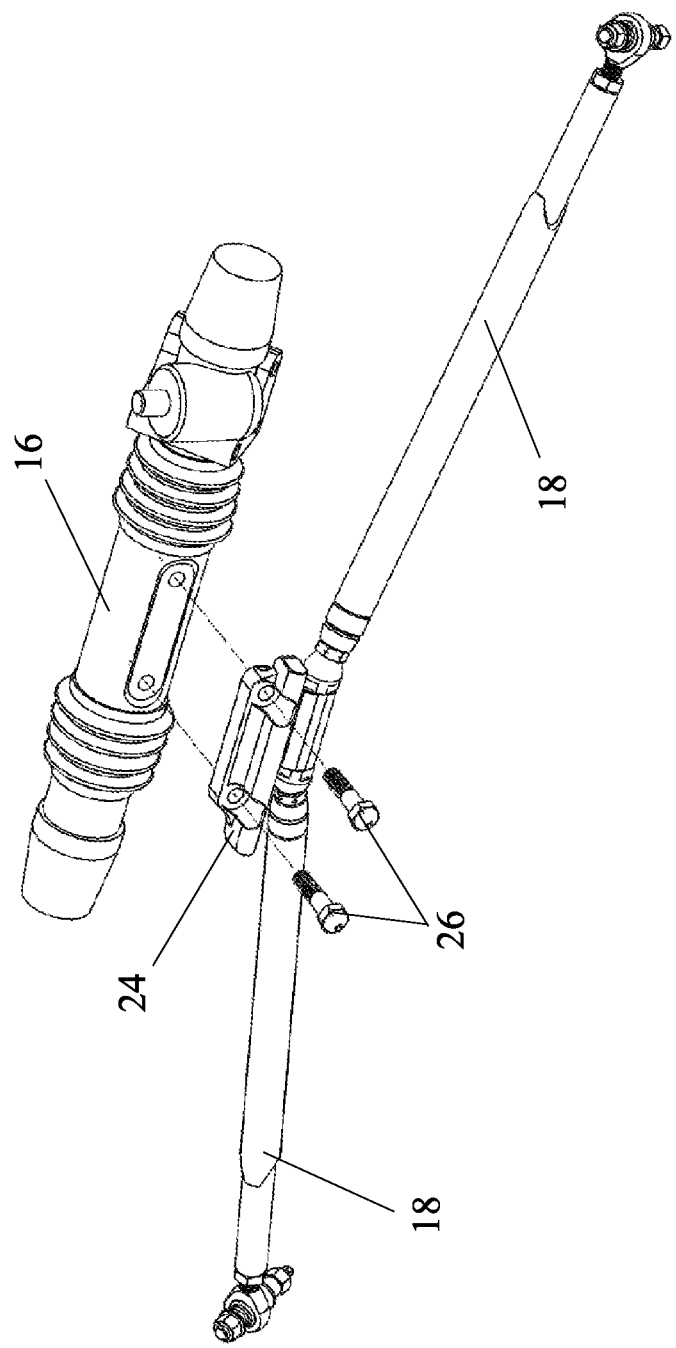
FIG. 1C is a perspective view of a conventional steering rack with tie rods coupled to a rack and pinion.

As shown in FIG. 1C, the steering assembly 10 typically also includes a small bracket 24 that is connected to the plurality of tie rods 18 and is bolted to the rack and pinion assembly 16, thus joining the rack and pinion assembly 16 to the tie rods 18. The bracket 24 often fails prematurely when the vehicle is used on rugged terrain due the forces that are transmitted through the bracket 24. The steering rack support assembly 100 is configured to redirect the forces which are typically transmitted through the bracket 24 and bolts 26 to instead be transmitted through new reinforced components. This helps to reduce premature failure of the steering assembly 10.

Although the rack and pinion assembly 16 is generally depicted and described herein as a mechanical rack and pinion assembly, some implementations may employ alternative steering assemblies (which may or may not include a rack and pinion) including for example: power steering assemblies, power assisted steering assemblies, drive by wire steering assemblies, active steering assemblies, capstan and bowstring steering assemblies, recirculating ball steering assemblies, hydraulic steering rack and pinion assemblies, electric servo assist rack and pinion assemblies, worm drive rack and pinion assemblies, swing steer assemblies, cam action type steering assemblies, wireless steering assemblies, similar steering 1 assemblies, or other steering assemblies yet to be developed.

Turning to FIGS. 2A-3D, the steering rack support assembly 100 may comprise a support shaft 104 and a sleeve 106. The support shaft 104 may have a first end 108, a second end 110, and at least one mounting member 112 or at least two mounting members 112. The at least two mounting members 112 may include a first mounting member 114 and a second mounting member 116. The first mounting member 114 may be affixed to the first end 108 of the support shaft 104, and the second mounting member 116 may be affixed to the second end 110 of the support shaft 104. Each of the at least two mounting members 112 is configured to couple to the frame 30 of the vehicle.

Instead of the support shaft 104, alternative implementations may employ a guide rail of any shape that accommodates a ball bearing carriage and/or a sleeve bearing carriage to slide and operate similar to the support shaft 104. The length of the support shaft 104 may be for example: 6 to 60 cm, 8 cm to 40 cm, 22 to 50 cm, or 30 to 42 cm. The relative length of the support shaft 104 may be: 1.1 to 4 times, 1.1 to 3 times, 1.1 to 2.8 times, or preferably 1.4 to 1.9 times longer than the length of the sleeve 106. The relative length of the support shaft 104 may be at least: 1.3 times longer, 1.5 times longer, or 1.7 times longer than the length of the sleeve 106.

In some implementations, the support shaft 104 and the rack and pinion assembly 16 are positioned so that a long axis of each is parallel or approximately parallel (e.g., the support shaft 104 may be parallel to the rack and pinion assembly 16 to within a tolerance of ±3°, ±5°, or ±8). In one or more implementations, one or both of the support shaft 104 and the rack and pinion assembly 16 are positioned to within a tolerance of ±5° or ±45° of being parallel to the axis of rotation of the nearest wheels 22 of the vehicle. In certain implementations, one or both of the support shaft 104 and the rack and pinion assembly 16 are positioned to within a tolerance of ±5° or ±15° of being parallel to a ground plane when the vehicle rests on a flat ground plane.

The sleeve 106 is slidably coupled to the support shaft 104 and may be disposed around an outer surface 118 of the support shaft 104. Relative movement occurs between the support shaft 104 and the sleeve 106 as the sleeve 106 slides back and forth. The distance over which the sleeve 106 travels on the support shaft 104 may be, for example: 1 cm to 40 cm, 5 to 20 cm, 7 to 15 cm, or 10 to 14 cm. The sleeve 106 may have a bracket 120 affixed to the sleeve 106 that is configured to couple to the rack and pinion assembly 16. The bracket 120 may be an aftermarket bracket, rather than an OEM bracket. The bracket 120 may also be configured to couple to a first tie rod 122 of the plurality of tie rods 18 and to a second tie rod 124 of the plurality of tie rods 18. Thus, briefly referring back to FIGS. 1A and 1B in connection with FIG. 3C, when the steering wheel 12 is turned to the right, the sleeve 106 moves to the left, which pushes the first tie rod 122 to the left and turns the wheels 22 to the right. Conversely, when the steering wheel 12 is turned to the left, the sleeve 106 moves to the right, which pushes the second tie rod 124 to the right and turns the wheels 22 to the left. Thus, when the steering rack support assembly 100 is coupled to the rack and pinion assembly 16, the first tie rod 122 and the second tie rod 124 are configured to change a selected direction of motion of the vehicle in response to movement of the sleeve 106 along the support shaft 104.

The steering rack support assembly 100 may further comprise the rack and pinion assembly 16, the first tie rod 122, and the second tie rod 124. In some implementations, the rack and pinion assembly 16 is a stock or original equipment manufacturer ("OEM") rack and pinion assembly. In such an embodiment, the steering rack support assembly 100 is added to the OEM rack and pinion assembly 16 by removing the OEM brackets 24 and replacing them with the bracket 120. In alternative implementations, the entire rack and pinion assembly 16 is included as part of the steering rack support assembly 100. In such embodiments, adding the steering rack support assembly 100 to the vehicle would include replacing the OEM rack and pinion assembly with a replacement rack and pinion assembly 16 (i.e., this replacement rack and pinion assembly 16 is one of the components of the steering rack support assembly 100) and also removing the bracket 24 and replacing it with the bracket 120.

Figure 2A:
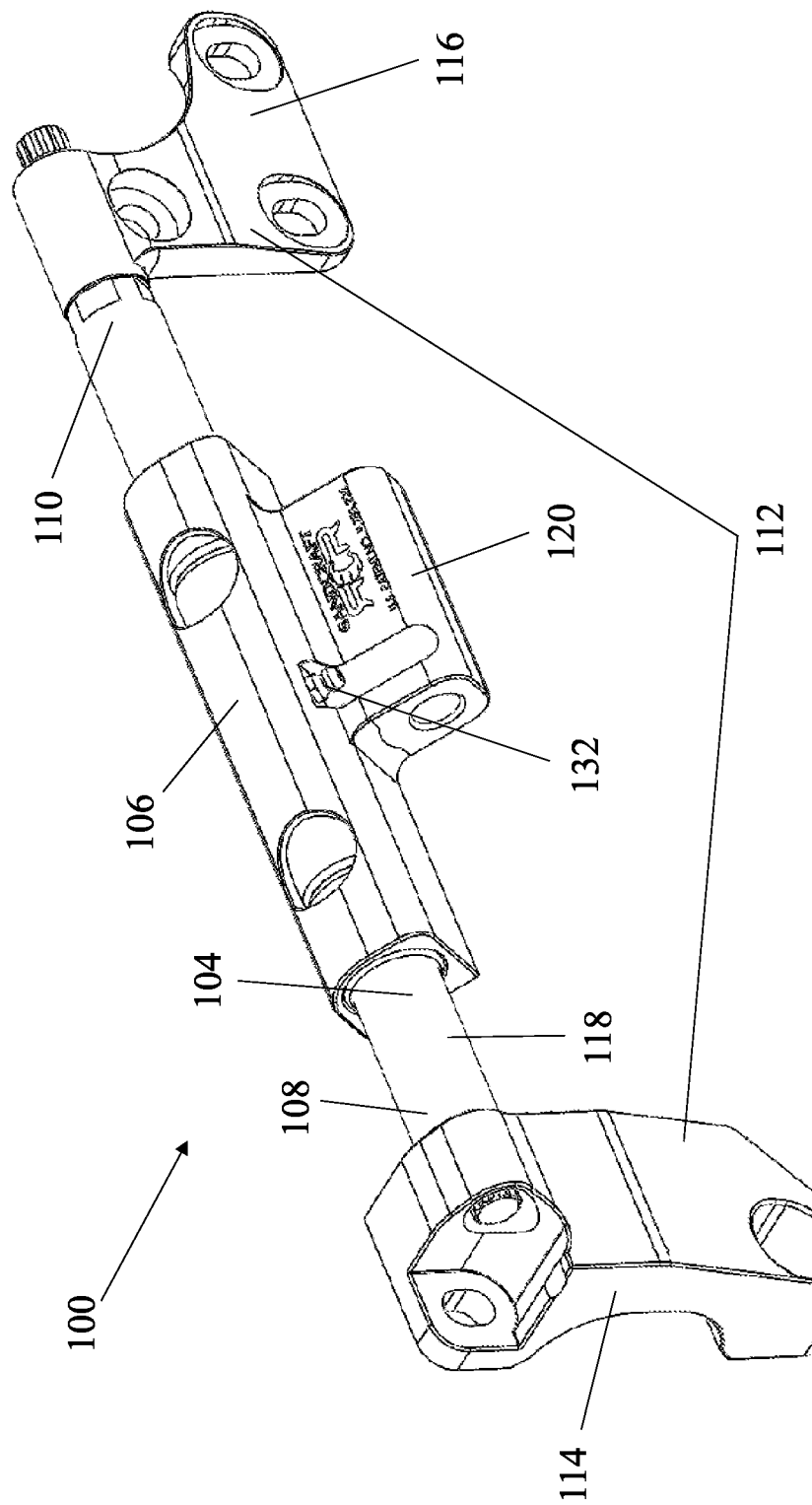
FIG. 2A is a perspective view of a steering rack support assembly.
Figure 2B:
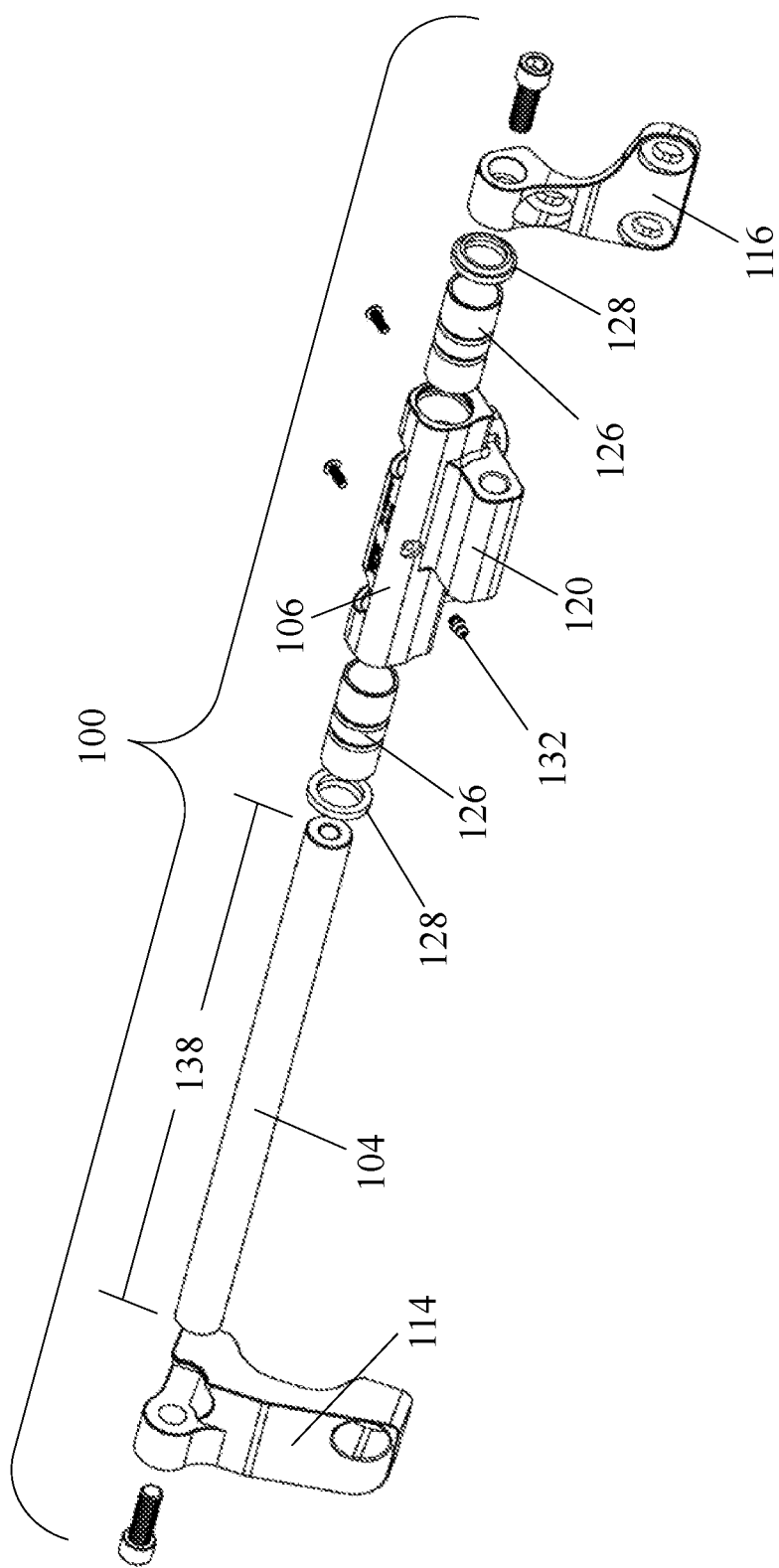
FIG. 2B is an exploded view of the steering rack support assembly shown in FIG. 2A.

As shown in FIG. 2B, the steering rack support assembly 10 may have bushings 126 and seals or bearing mount seals 128 positioned between the sleeve 106 and the support shaft 104. The bushings 126 may be any one of various bushings and/or plain bearings (e.g., sleeve bushing, flanged bushing, multi-piece bushings, split bushing, etc.) and may utilize one or more lubrication or movement materials or mechanisms (e.g., lubricants, grease, ball bearings, polymer surfaces, or other lubricants or bearings). The bushings 126 and the seals 128, together with the sleeve 106, form an enclosed and sealed area within the sleeve 106 that allows lubricant to be stored therein. This lubricant can be used to lubricate or reduce friction between the sleeve 106 and the support shaft 104, thus facilitating smooth movement of the sleeve 106 along the support shaft 104. The sleeve 106 may have a grease zerk 132 configured to allow lubricant to be added to the enclosed area within the sleeve 106. The sleeve 106, bushings 126, and support shaft 104 may operate together as: a linear bearing; a plain bearing; a sleeve bearing; a linear bushing; a linear guide; a linear slide; or another bearing, bushing, slide, or the like. The sleeve 106, bushings 126, and support shaft 104 may operate together as: a linear bearing having ball bearings; a recirculating ball type linear bearing; a linear bearing with the support shaft 104 lubricated by direct contact with a lubricating oil, grease, or liquid; or another bearing, bushing, or slide having ball bearings or being lubricated by oil or grease or other suitable lubrication substances or mechanisms. The sleeve 106, bushings 126, and support shaft 104 may also operate together as a bearing, bushing, or slide without being lubricated by oil, grease, liquid, or other common lubrication substances or mechanisms.

Figure 3A:
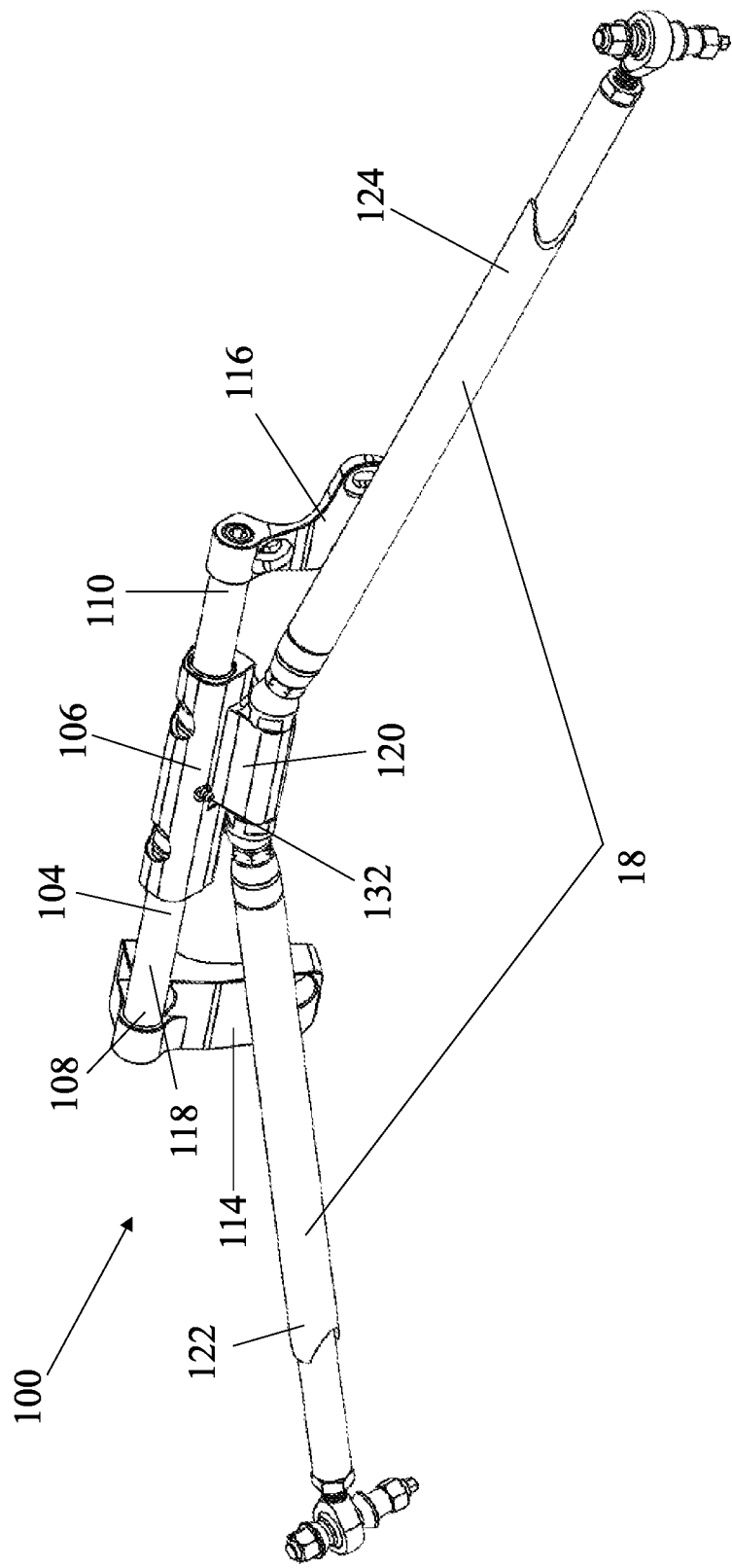
FIG. 3A is a perspective view of the steering rack support assembly shown in FIG. 2A coupled to the first tie rod and the second tie rod.
Figure 3B:
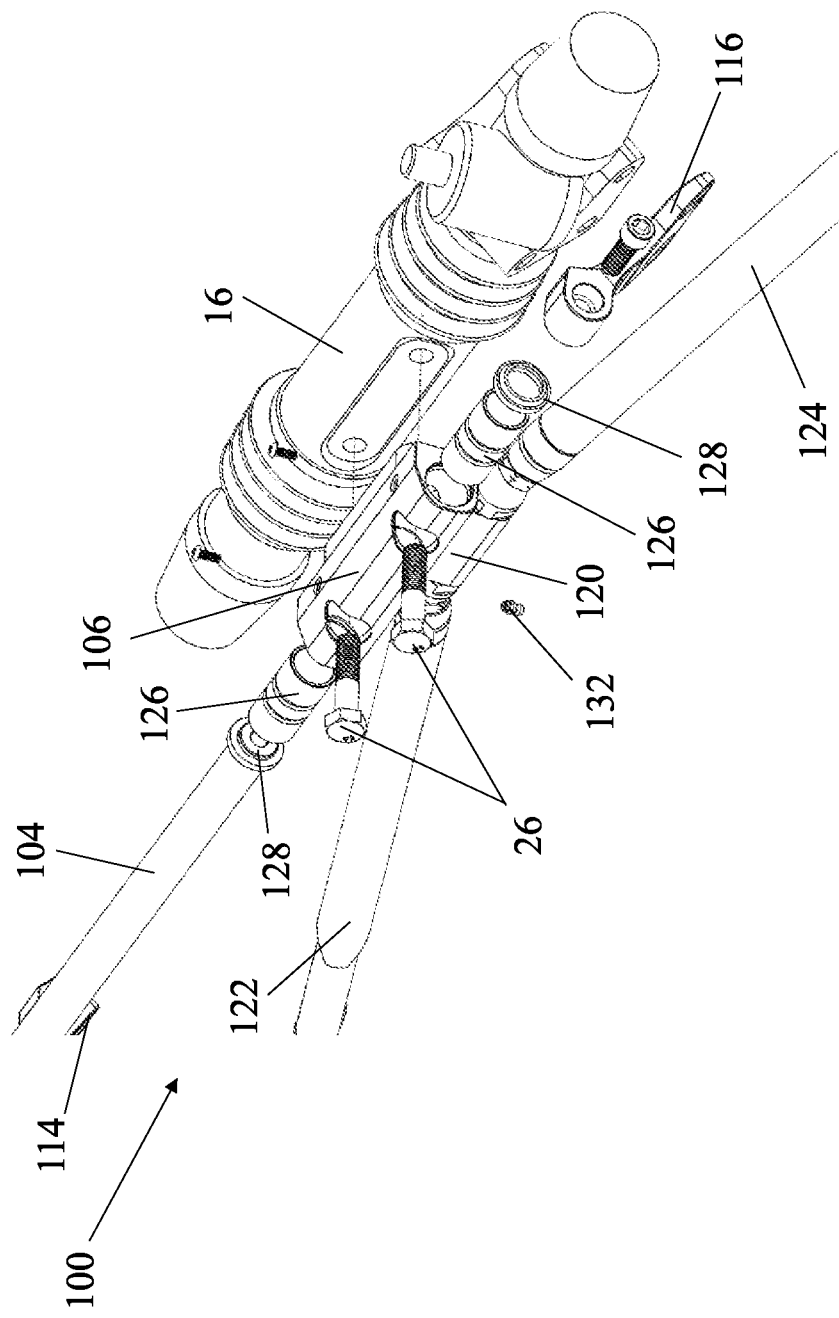
FIG. 3B is a close-up exploded view of the steering rack support assembly shown in FIG. 3A with a rack and pinion assembly.
Figure 3C:
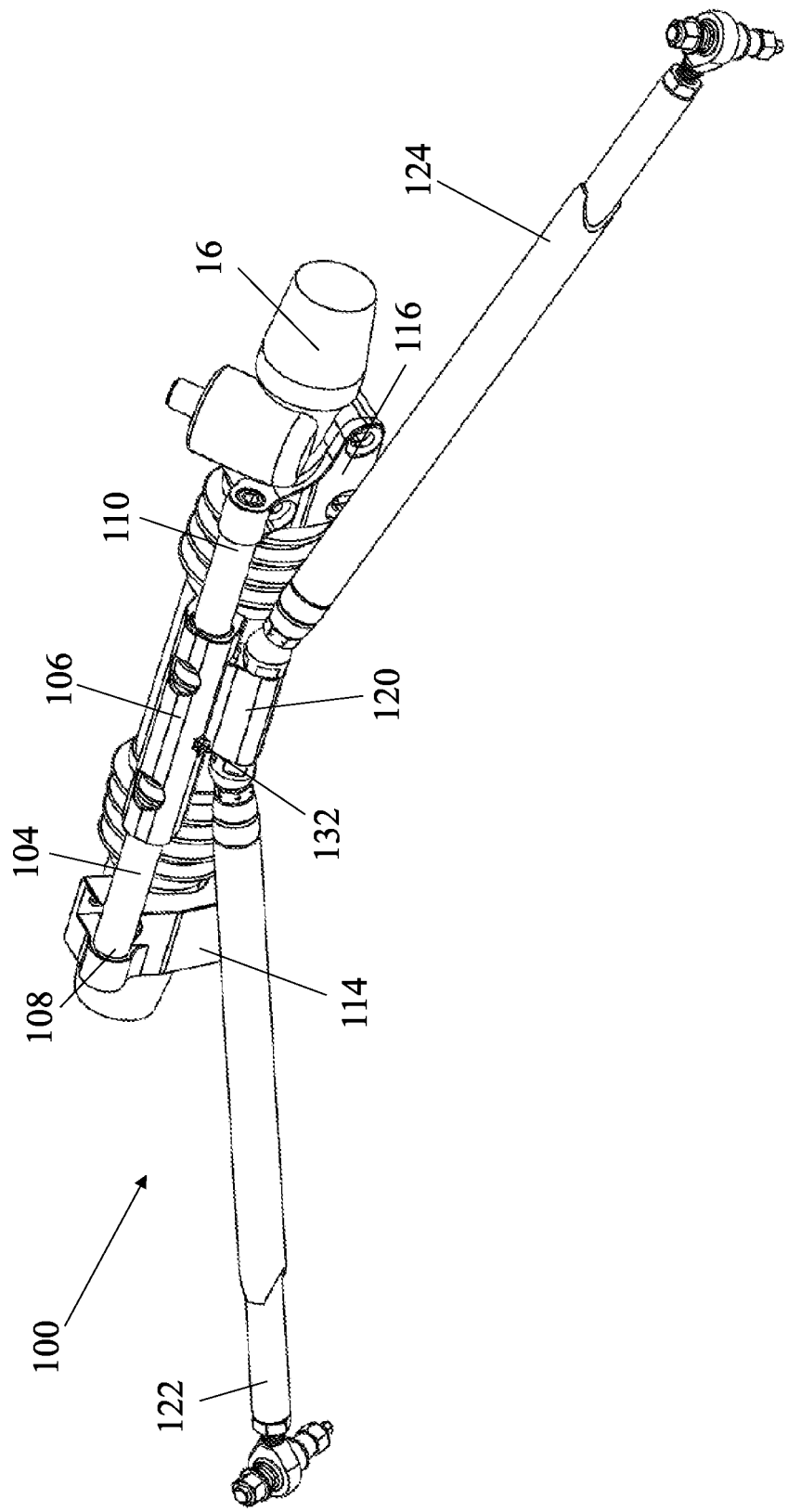
FIG. 3C is a perspective view of the steering rack support assembly shown in FIG. 2A coupled to a rack and pinion assembly, a first tie rod, and a second tie rod.
Figure 3D:
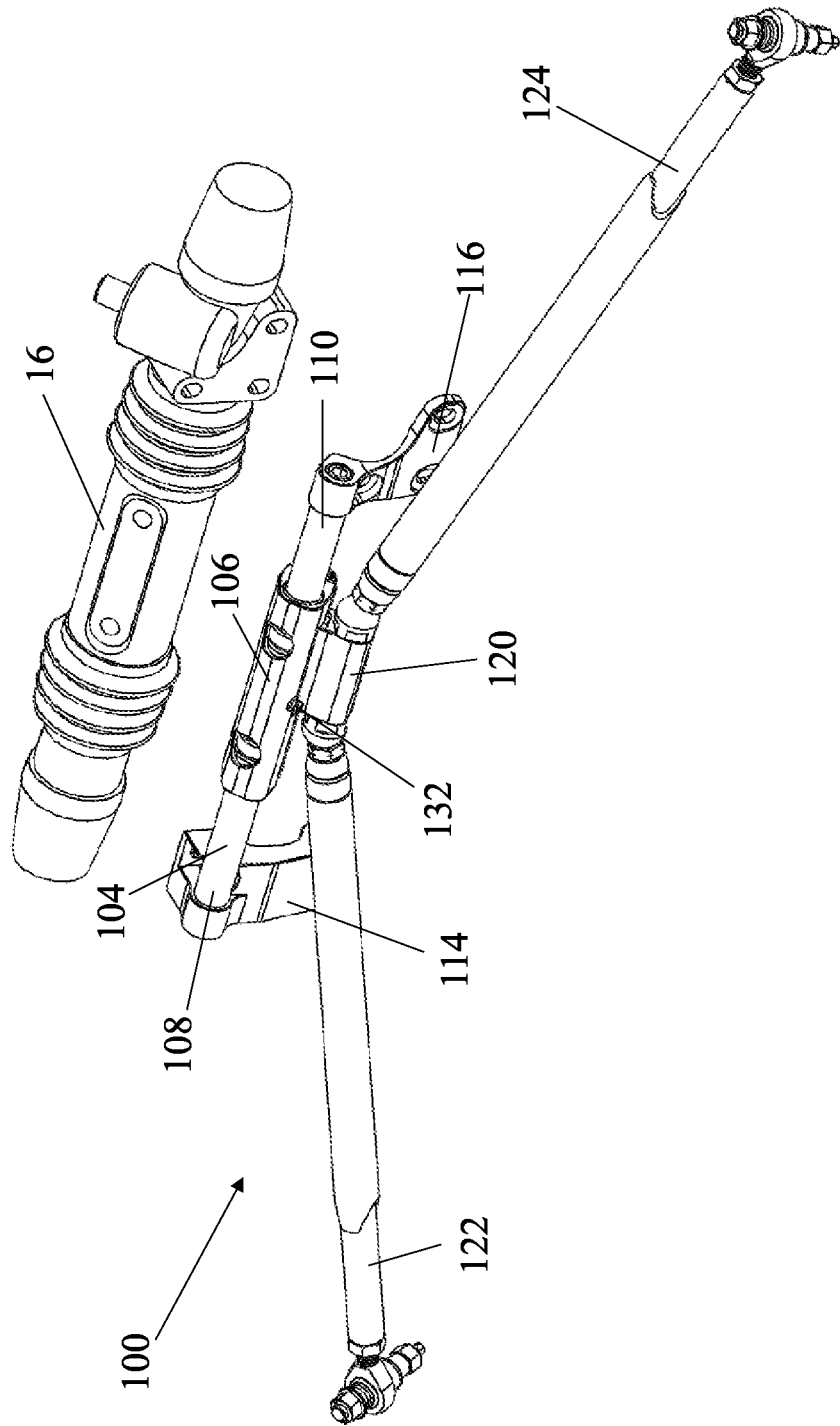
FIG. 3D is a perspective view of the steering rack support assembly shown in FIG. 3C detached from the rack and pinion assembly.
Figure 4A:
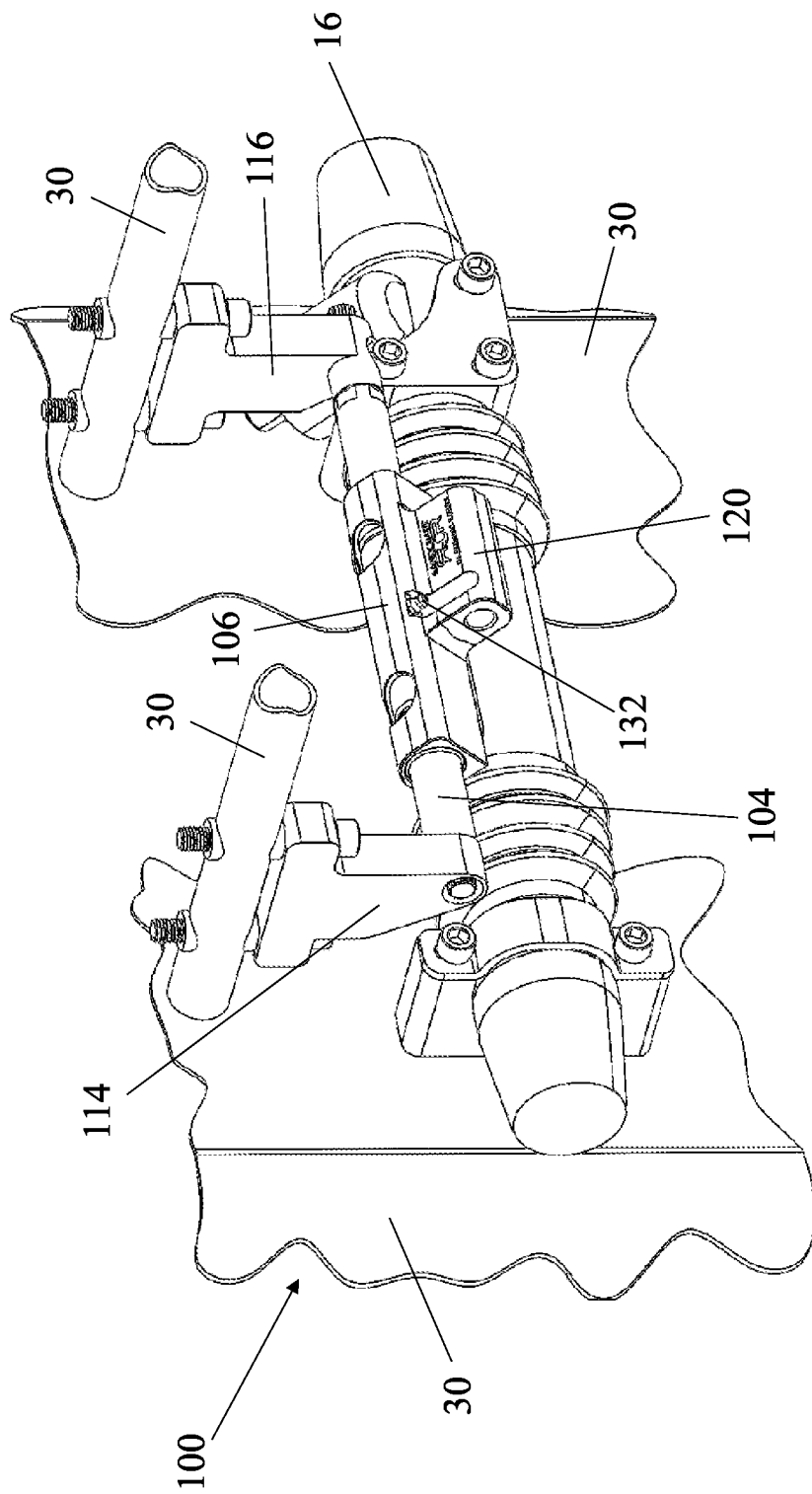
FIG. 4A is a perspective view of the steering rack support assembly shown in FIG. 2A directly attached to the frame of the vehicle.
Figure 4B:
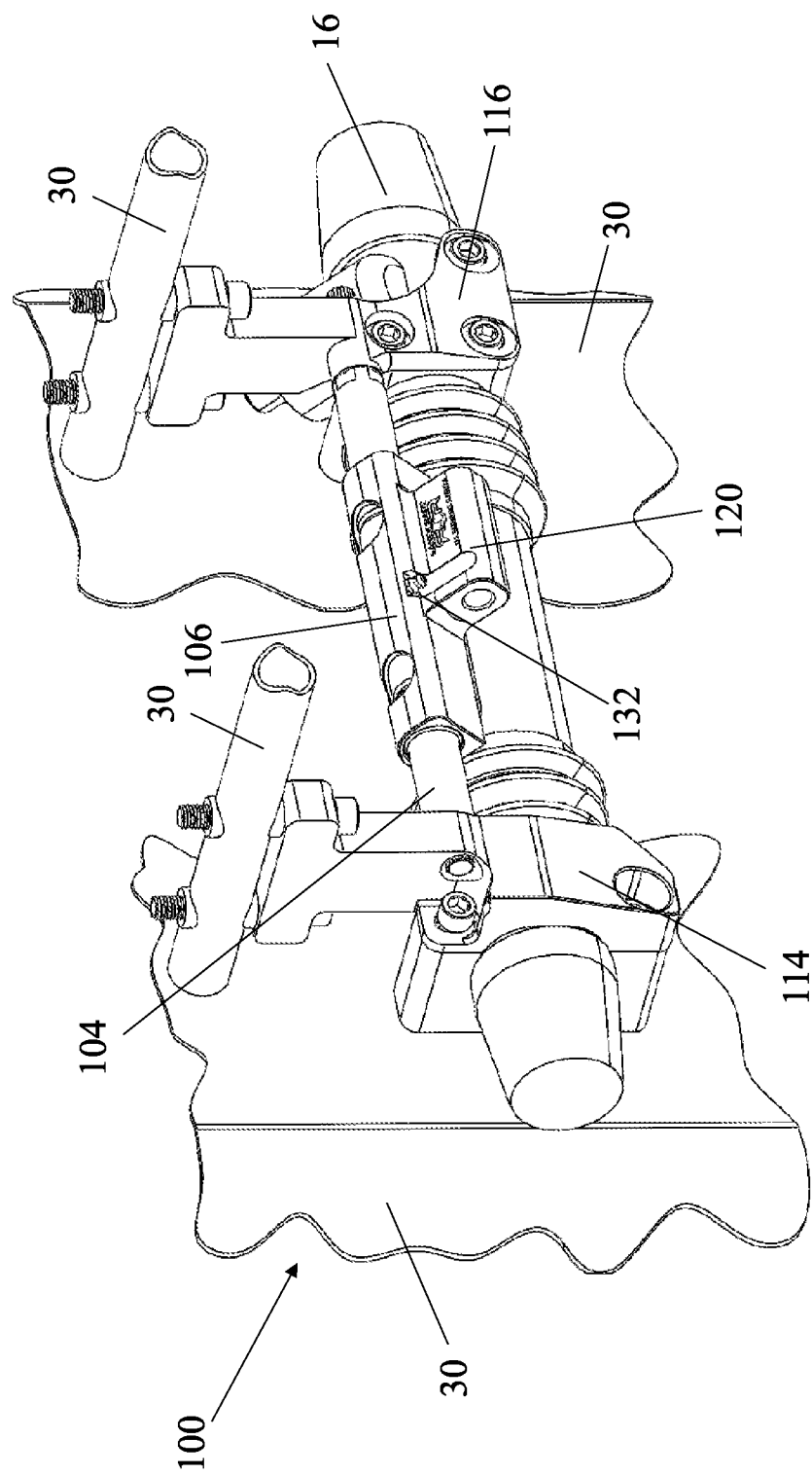
FIG. 4B is a perspective view of the steering rack support assembly shown in FIG. 2A directly attached to the frame of the vehicle and to the rack and pinion assembly.
Figure 4C:
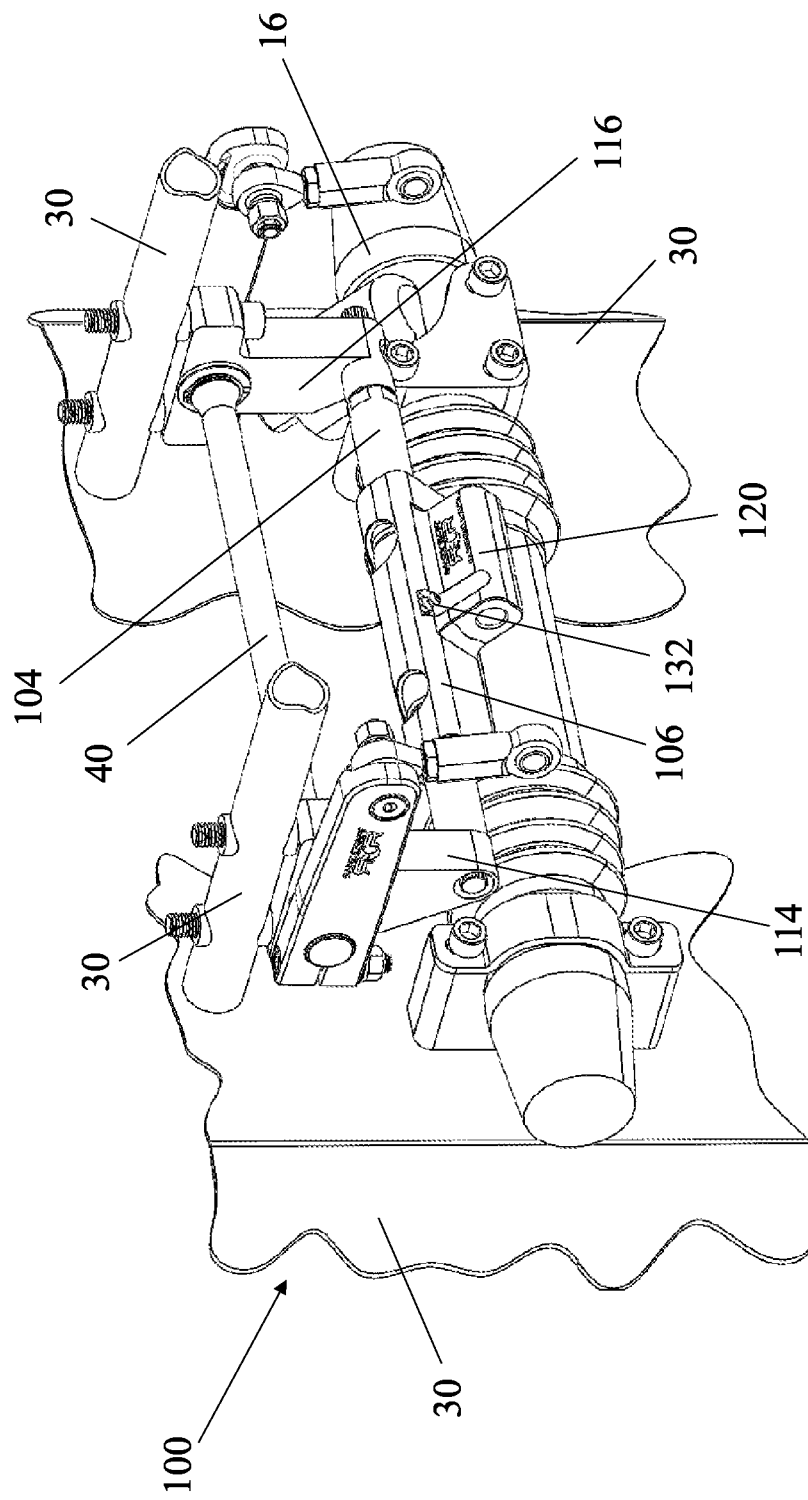
FIG. 4C is a perspective view of the steering rack support assembly shown in FIG. 2A directly attached to the sway bar of the vehicle.
Figure 4D:
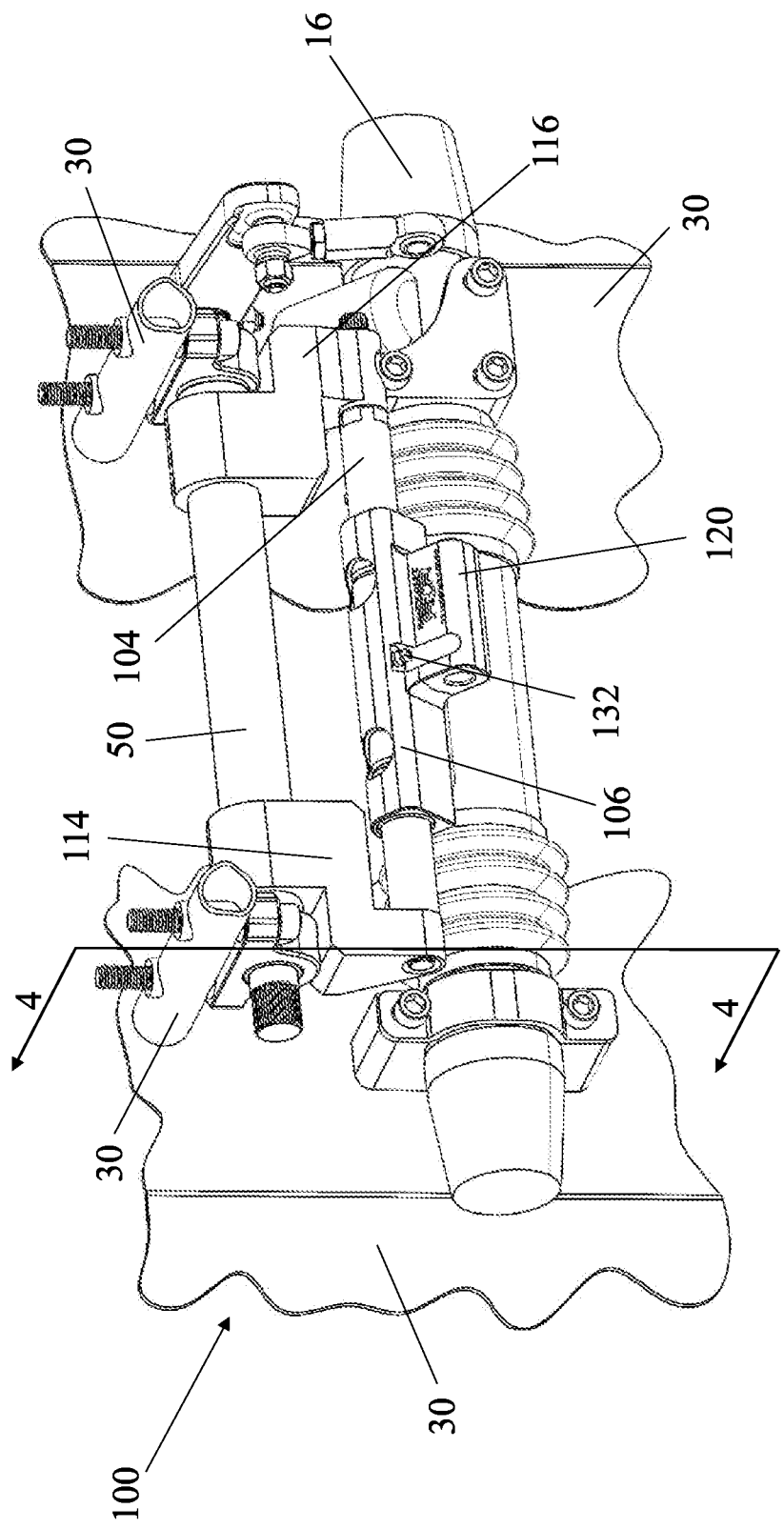
FIG. 4D is a perspective view of the steering rack support assembly shown in FIG. 2A directly attached to the sway bar through a tube.
Figure 4E:
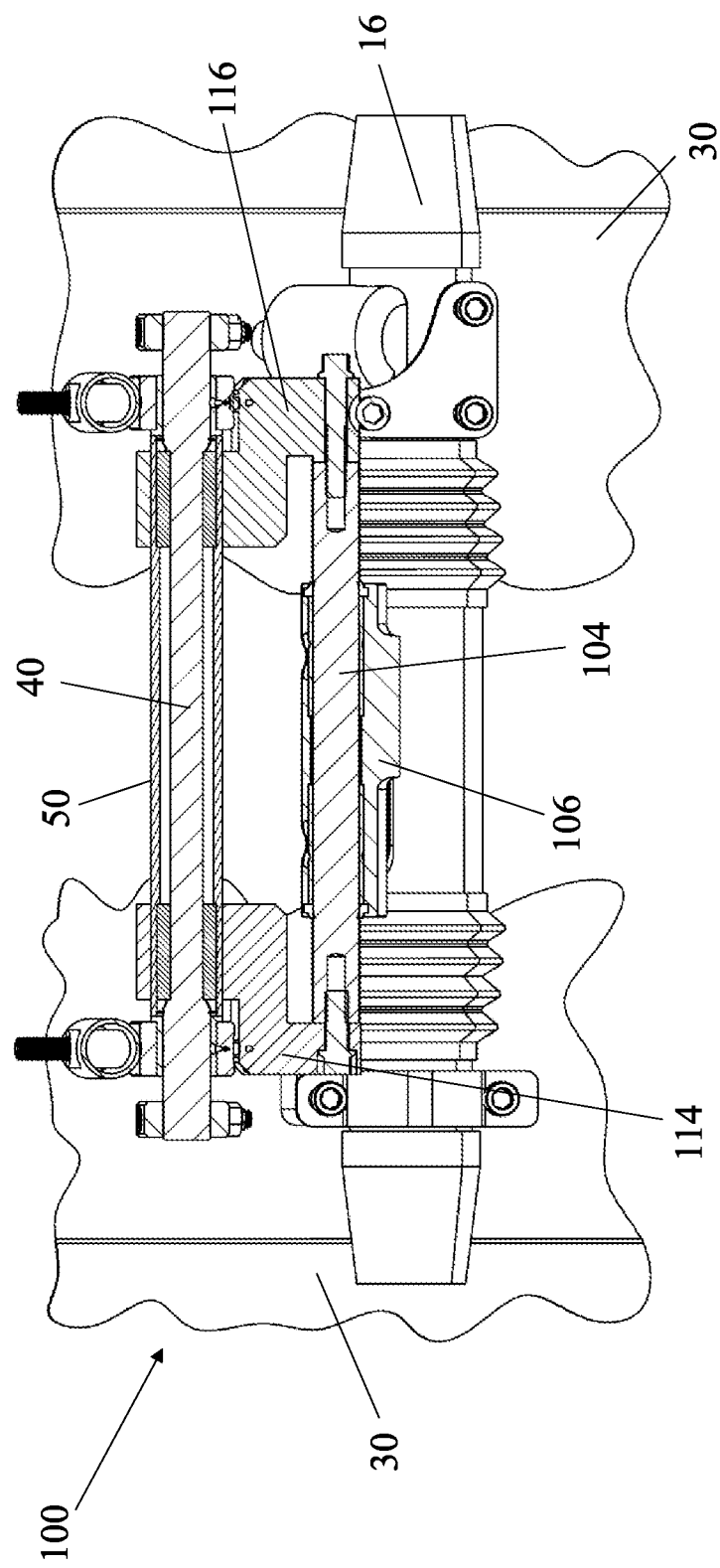
FIG. 4E is a cross-section view of the steering rack support assembly shown in FIG. 4D taken along line 4-4.
Figure 5A:
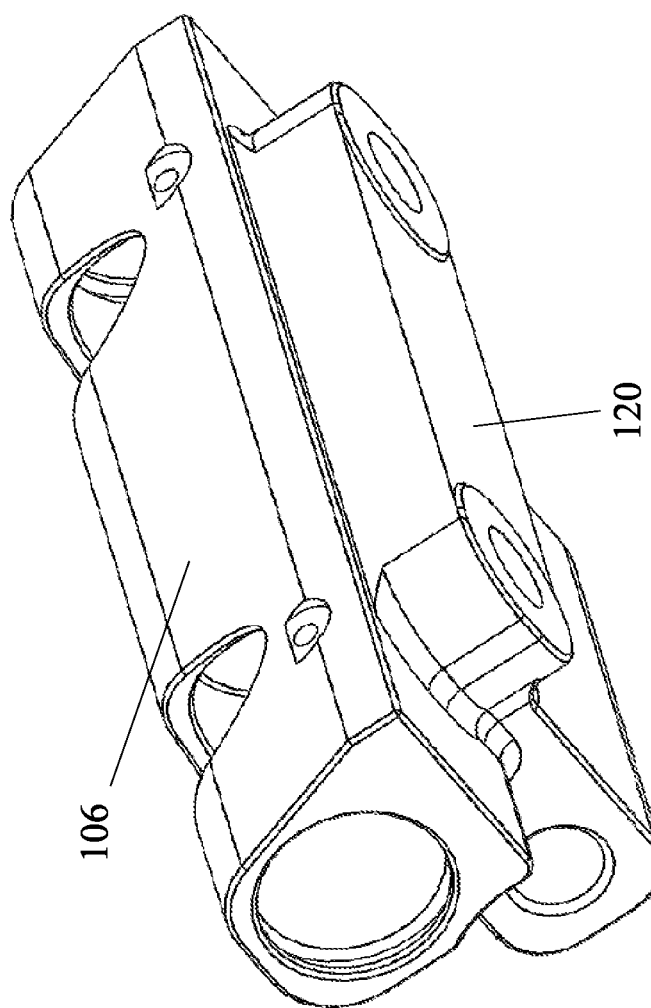
FIG. 5A is a perspective view of the bracket and the sleeve of the steering rack support assembly shown in FIG. 2A.
Figure 5B:
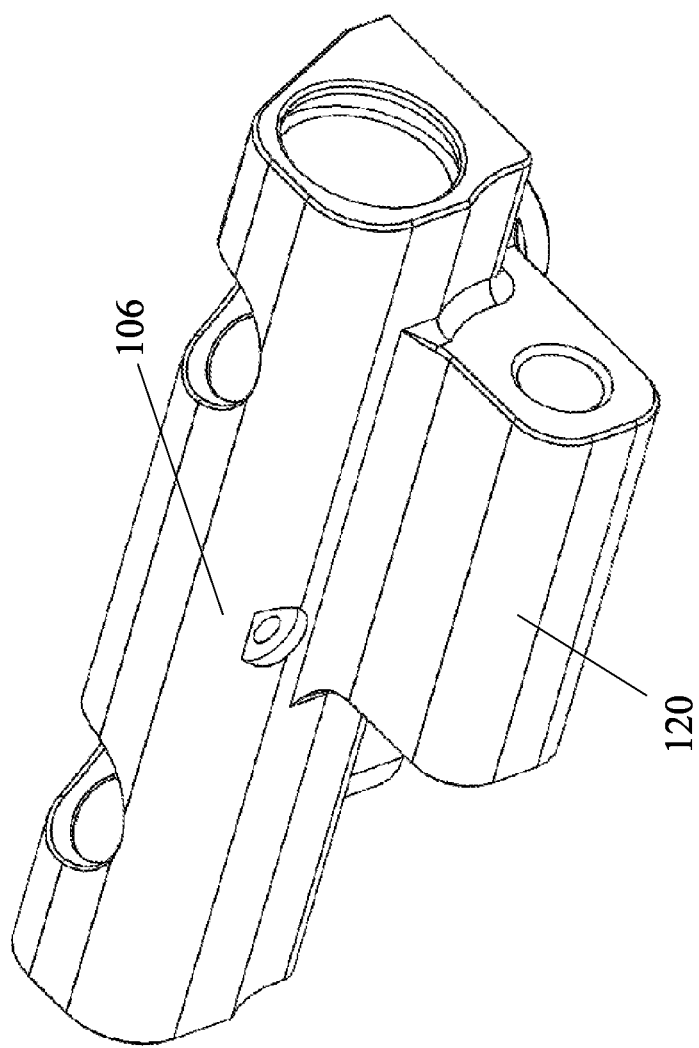
FIG. 5B is another perspective view of the bracket and the sleeve of the steering rack support assembly shown in FIG. 2A.
Figure 5C:
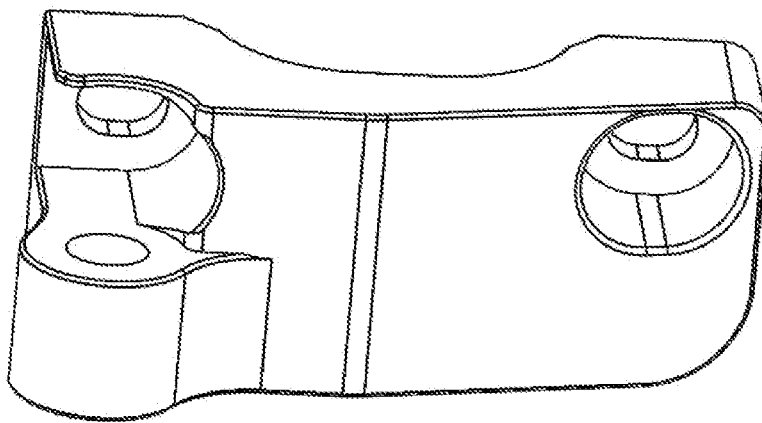
FIG. 5C is a perspective view of the first mounting member of the steering rack support assembly shown in FIG. 2A.
Figure 5D:
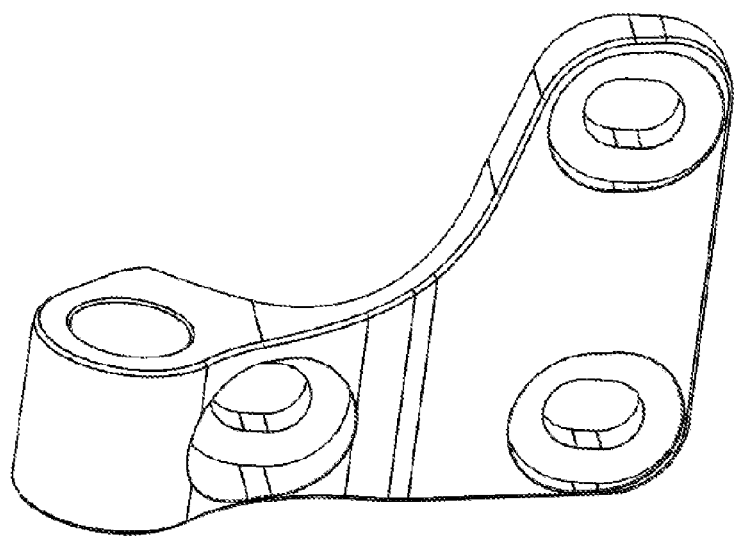
FIG. 5D is a perspective view of the second mounting member of the steering rack support assembly shown in FIG. 2A.

As noted above, the at least two mounting members 112 are coupled to the frame 30 of the vehicle. In some embodiments, the at least two mounting members 112 are directly attached to the frame 30 of the vehicle, as shown in FIGS. 4A and 4B. In other embodiments, the at least two mounting members 112 are coupled to the frame 30 through another component. For example, the at least two mounting members 112 may be configured to directly attach to the rack and pinion assembly 16, as shown in FIGS. 3B-3D. Because the rack and pinion assembly 16 is coupled to the frame 30 of the vehicle, this couples the at least two mounting members 112 to the frame 30 as well. The rack and pinion assembly 16 may also be directly attached to the frame 30 and directly attached to the rack and pinion assembly 16 (see FIG. 4B). The at least two mounting members 112 may also be configured to directly attach to a sway bar 40 of the vehicle, as shown in FIGS. 4C-4E. Because the sway bar 40 moves when in use, the at least two mounting members 112 may directly attach to the sway bar 40 by being directly attached to a tube 50 surrounding the sway bar, as shown in FIGS. 4D-4E. Because the sway bar 40 is coupled to the frame 30 of the vehicle, this couples the at least two mounting members 112 to the frame 30 as well.

FIGS. 5A-5D illustrate various components of the steering rack support assembly 100, including the bracket 120, the first mounting member 114, and the second mounting member 116. As shown, the bracket 120 and the sleeve 106 may be integrally formed together. As also shown, the first mounting member 114 and the second mounting member 116 may be configured to attach to other components of the vehicle, such as the steering rack, the sway bar 40, the rack and pinion assembly 16, or the frame 30, using threaded fasteners.

Figure 6A:
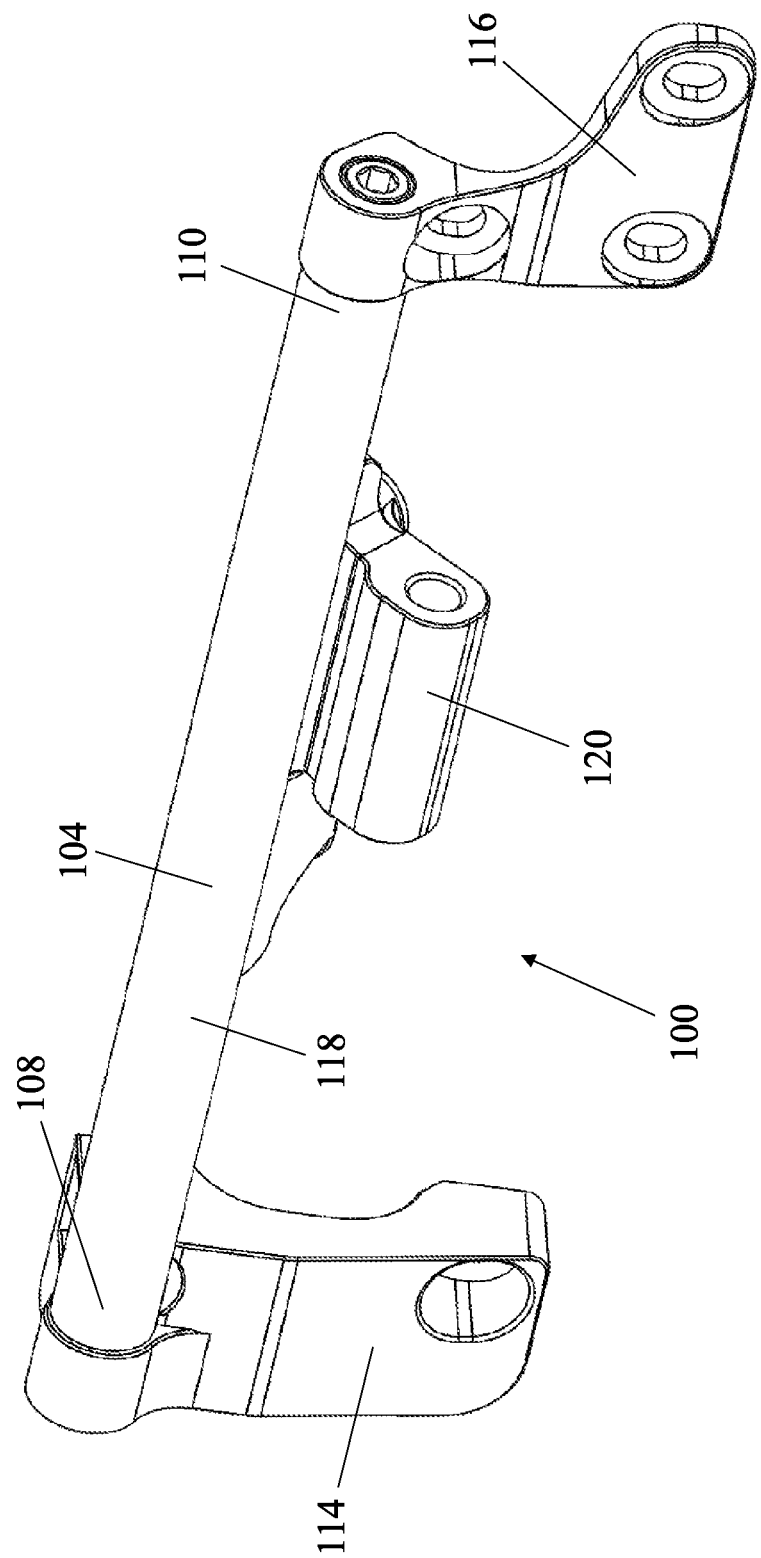
FIG. 6A is a perspective view of another embodiment of the steering rack support assembly
Figure 6B:
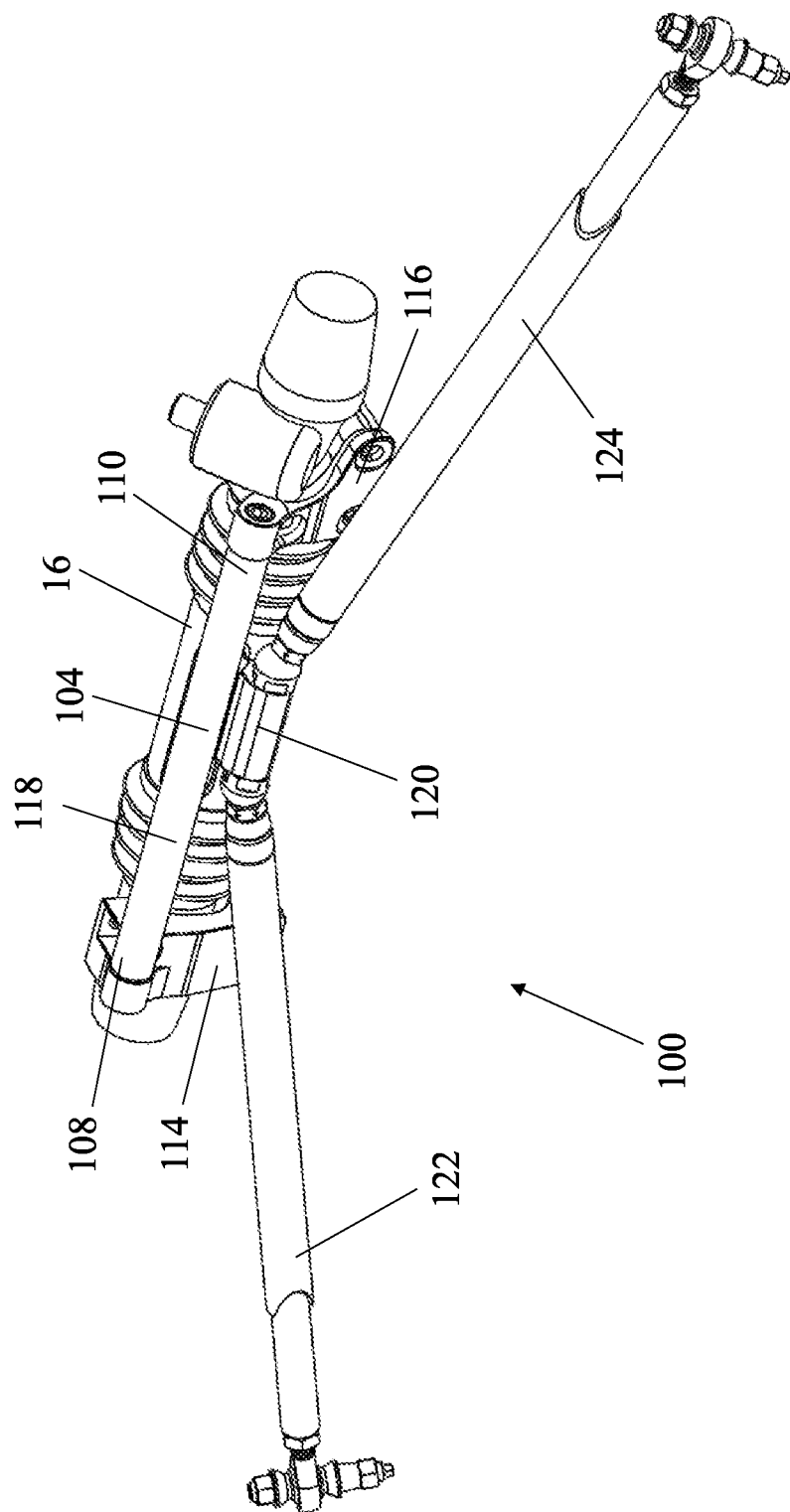
FIG. 6B is a perspective view of the steering rack support assembly shown in FIG. 6A coupled with a rack and pinion assembly, a first tie rod, and a second tie rod.
Figure 6C:
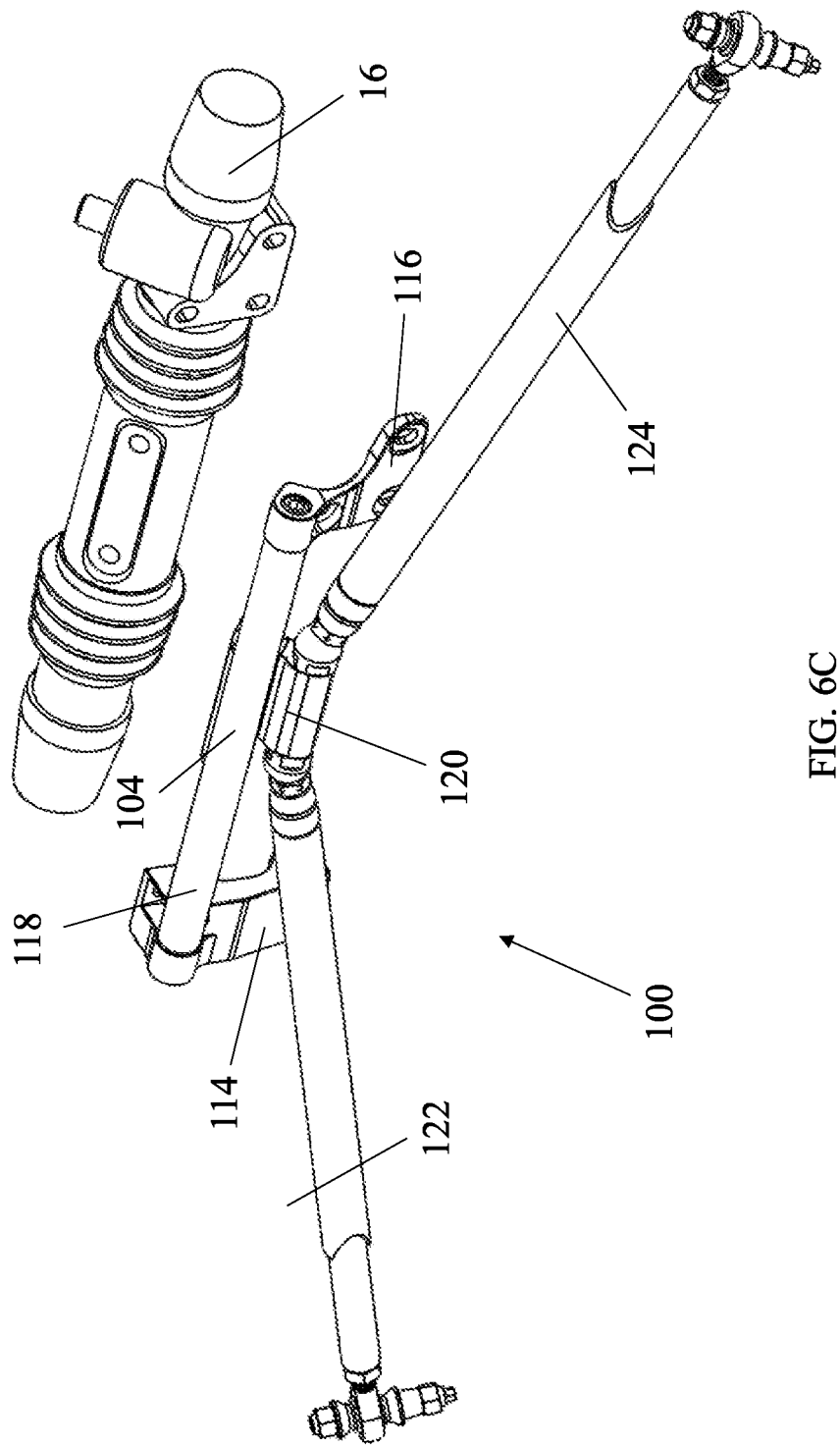
FIG. 6C is a perspective view of the steering rack support assembly shown in FIG. 6B with the rack and pinion assembly removed.
Figure 6D:
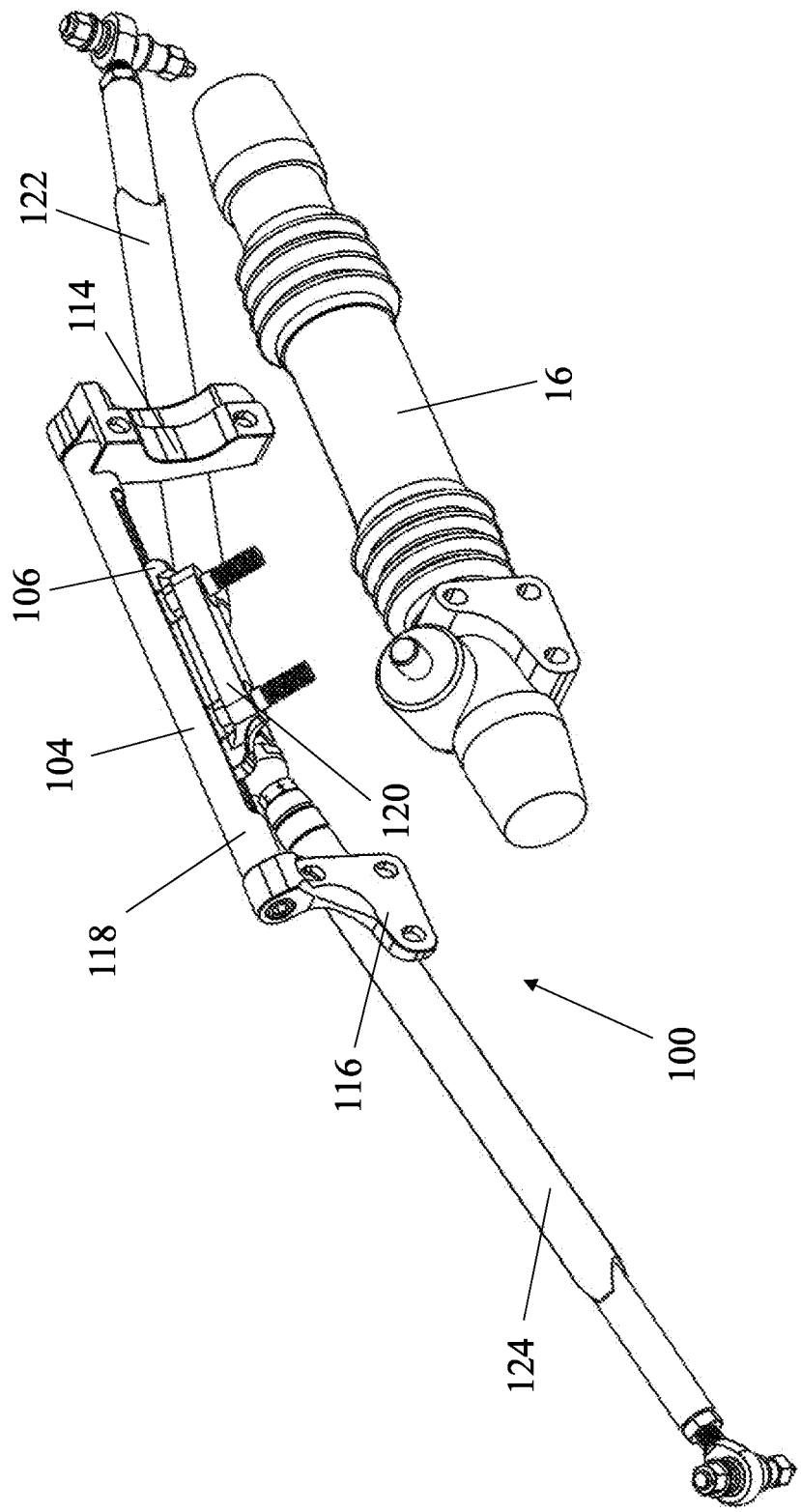
FIG. 6D is another perspective view of the steering rack support assembly shown in FIG. 6B with the rack and pinion assembly removed.
Figure 6E:
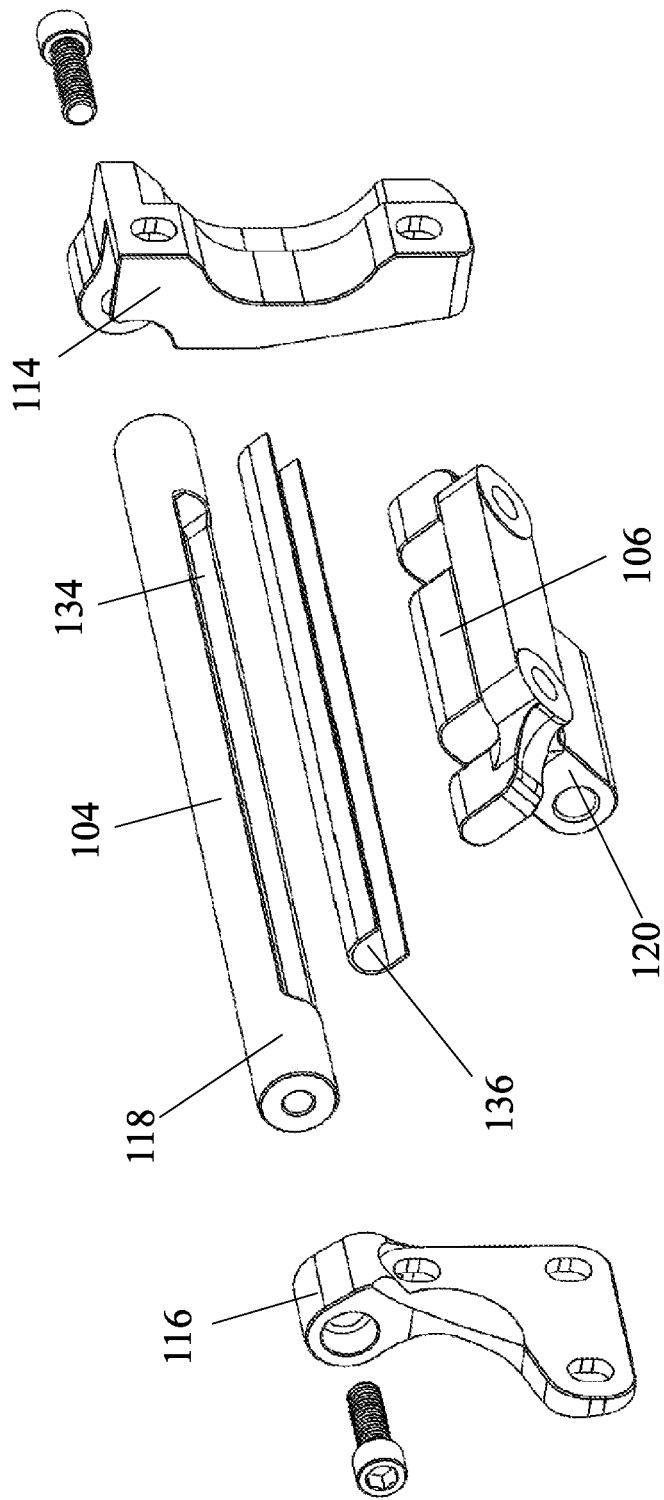
FIG. 6E is an exploded view of the steering rack support assembly shown in FIG. 6A.
Figure 6F:
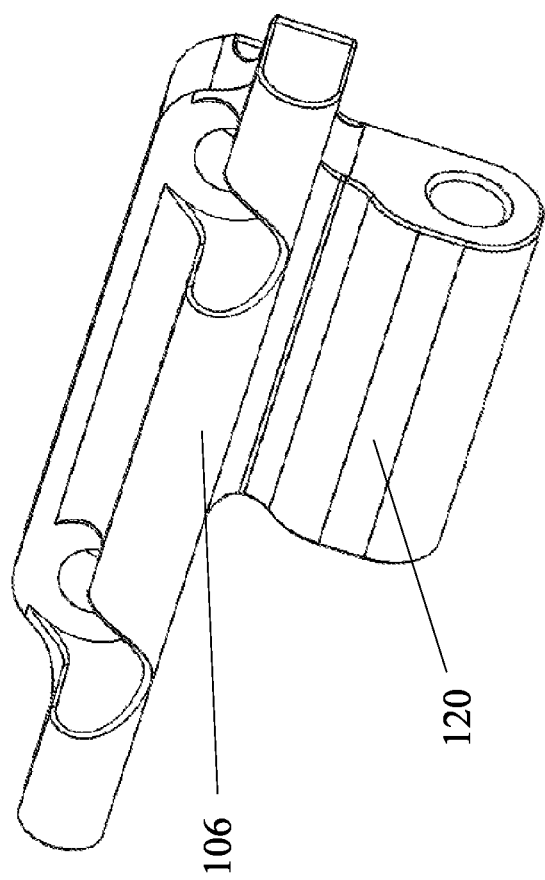
FIG. 6F is a perspective view of the bracket and sleeve of the steering rack support assembly shown in FIG. 6A.

FIGS. 6A-6F illustrate another embodiment of the steering rack support assembly 100, which functions similarly to the embodiment shown in FIGS. 2A-3D. However, instead of the sleeve 106 being disposed around an outer surface 118 of the support shaft 104, the sleeve shown in FIGS. 6A-6F extends into the interior of the support shaft 104. Thus, as shown in FIG. 6E, the support shaft 104 may have a slot 134 configured to receive the sleeve 106. In addition, the steering rack support assembly 100 may comprise an insert 136 configured to be positioned between the sleeve 106 and the support shaft 104, as shown in FIG. 6E. The insert 136 may be formed of a material selected to reduce the frictional force between the support shaft 104 and the sleeve 106. Additionally, the insert 136 is easy to remove, and thus is easily replaced if it becomes worn over time. The sleeve may be formed integrally with the bracket 120, as shown in FIGS. 6E and 6F.

Figure 7A:
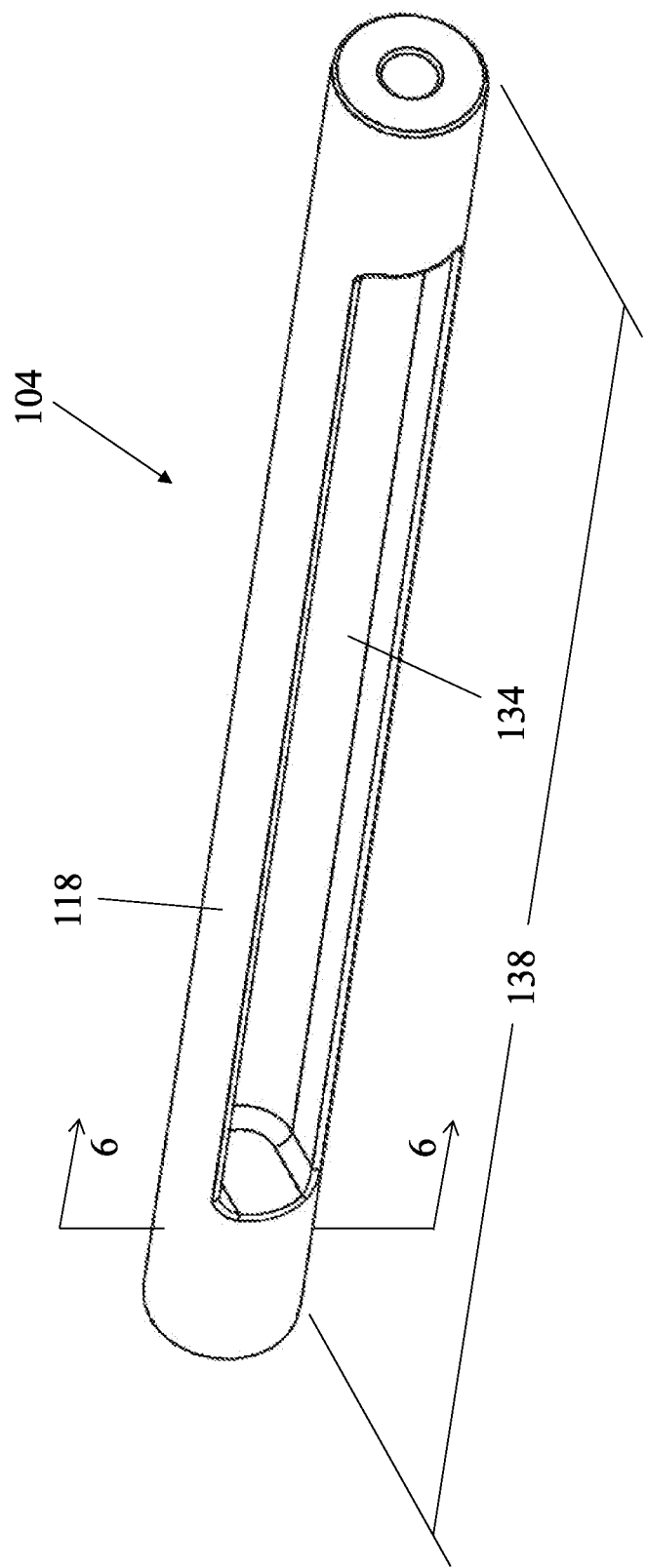
FIG. 7A is a perspective view of the support shaft of the steering rack support assembly shown in FIG. 6A.
Figure 7D:
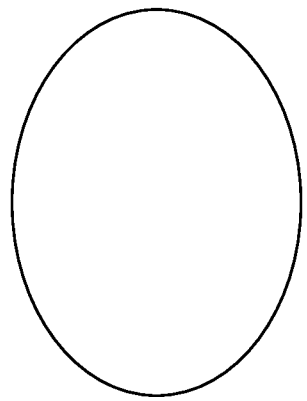
FIGS. 7B, 7C, and 7D are cross section views of various embodiments of the support shaft shown in FIG. 7A, taken along line 7-7.
Figure 7C:
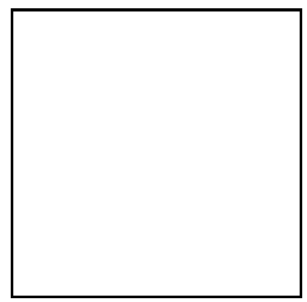
Figure 7B:
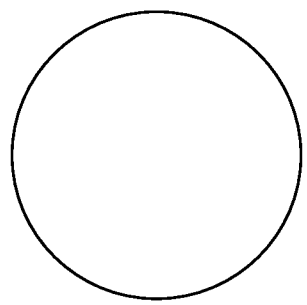

As shown in FIG. 7A, the support shaft 104 may have an elongated shape with a cross section that is rectilinear, curvilinear, or irregular in shape. As shown in FIGS. 7A-7D, the support shaft 104 may have a cross section that is substantially the same along a length 138 of the support shaft 104 extending between the first end 108 and the second end 110. The outer shape of the cross section may be circular, as shown in FIG. 7B. In such an embodiment, the diameter of the support shaft 104 may be, for example: 1 to 8 cm, 1.5 to 6 cm, 1.5 cm to 5.5 cm, 1.5 to 4.5 cm, or 2 to 3 cm. Alternatively, the outer shape of the cross section may be rectangular as shown in FIG. 7C or elliptical as shown in FIG. 7D. Any other shape and size may also be selected. While other features of the support shaft 104 may interrupt the cross section, such as the slot 134 or a hole for a bolt, the cross section may remain substantially the same size and shape along the length 138 of the support shaft 104 that extends between the first end 108 and the second end 110.

The disclosed implementations of the steering rack support assembly 100 provide increased strength above and beyond the strength provided by an OEM steering assembly 10. The steering rack support assembly 100 helps to reduce or prevent rotation of the rack within the rack and pinion assembly 16 when under linear and rotational stress, which helps reduce wear and tear on the gear box assembly within the steering assembly 10. The improved handling of linear and radial stresses to the rack and pinion assembly 16 provided by the steering rack support assembly 100 increases stability and reduces the risk of steering loss or malfunction, thereby increasing the safety for users. The steering rack support assembly 100 may also decrease or dampen forces from the plurality of tie rods 18, which may allow for better control and steering during use.

It will be understood that implementations of a steering rack support assembly are not limited to the specific assemblies, devices and components disclosed in this document, as virtually any assemblies, devices and components consistent with the intended operation of a steering rack support assembly may be used. Accordingly, for example, although particular steering rack support assemblies, and other assemblies, devices and components are disclosed, such may include any shape, size, style, type, model, version, class, measurement, concentration, material, weight, quantity, and/or the like consistent with the intended operation of steering rack support assemblies. Implementations are not limited to uses of any specific assemblies, devices and components; provided that the assemblies, devices and components selected are consistent with the intended operation of a steering rack support assembly.

Accordingly, the components defining any steering rack support assembly may be formed of any of many different types of materials or combinations thereof that can readily be formed into shaped objects provided that the materials selected are consistent with the intended operation of a steering rack support assembly. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various steering rack support assemblies may be manufactured using conventional procedures as added to and improved upon through the procedures described here. Some components defining a steering rack support assembly may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling steering rack support assemblies are not limited to the specific order of steps as disclosed in this document. Any steps or sequence of steps of the assembly of a steering rack support assembly indicated herein are given as examples of possible steps or sequence of steps and not as limitations, since various assembly processes and sequences of steps may be used to assemble steering rack support assemblies.

The implementations of a steering rack support assembly described are by way of example or explanation and not by way of limitation. Rather, any description relating to the foregoing is for the exemplary purposes of this disclosure, and implementations may also be used with similar results for a variety of other applications employing a steering rack support assembly.

What is claimed is:

1. An aftermarket steering rack support assembly coupled to a rack and pinion assembly, comprising:
   a support shaft having a first end and a second end, wherein a cross section of the support shaft is substantially the same along a length of the support shaft extending between the first end and the second end;
   a first mounting member affixed to the first end of the support shaft and affixed to the rack and pinion assembly outward of a first billows, wherein the first billows is axially aligned with the rack and pinion assembly;
   a second mounting member affixed to the second end of the support shaft and affixed to the rack and pinion assembly outward of a second billows, wherein the second billows is axially aligned with the rack and pinion assembly;

a sleeve disposed around an outer surface of the support shaft and slidably coupled to the support shaft, the sleeve being fixedly coupled to the rack and pinion assembly inward of the first billows and the second billows; and an aftermarket bracket affixed to the sleeve, the bracket coupled to a first tie rod and a second tie rod, wherein the first tie rod and the second tie rod are configured to change a selected direction of motion of a vehicle in response to movement of the sleeve along the support shaft.

2. The steering rack support assembly of claim 1, further comprising the rack and pinion assembly, the first tie rod, and the second tie rod.

3. The steering rack support assembly of claim 1, wherein the first mounting member and the second mounting member are each configured to directly attach to a sway bar of the vehicle.

4. The steering rack support assembly of claim 1, wherein the first mounting member and the second mounting member are each configured to directly attach to the frame of the vehicle.

5. The steering rack support assembly of claim 1, wherein the cross section of the support shaft is circular.

6. The steering rack support assembly of claim 1, wherein the cross section of the support shaft is rectangular.

7. An aftermarket steering rack support assembly configured to be coupled to a rack and pinion assembly, comprising:

a support shaft having a first end and a second end;

a first mounting member configured to be affixed to the first end of the support shaft and affixed to the rack and pinion assembly outward of a first billows, wherein the first billows is axially aligned with the rack and pinion assembly;

a second mounting member configured to be affixed to the second end of the support shaft and affixed to the rack and pinion assembly outward of a second billows, wherein the second billows is axially aligned with the rack and pinion assembly; and a sleeve slidably coupled to the support shaft, the sleeve having a bracket affixed to the sleeve, the sleeve configured to fixedly couple to the rack and pinion assembly inward of the first billows and the second billows and the bracket coupled with a first tie rod and a second tie rod that are configured to change a selected direction of motion of the vehicle in response to movement of the sleeve along the support shaft.

8. The steering rack support assembly of claim 7, further comprising the rack and pinion assembly, the first tie rod, and the second tie rod, wherein the at least one mounting member is configured to directly attach to the rack and pinion assembly.

9. The steering rack support assembly of claim 7, wherein the at least one mounting member is configured to directly attach to a sway bar of the vehicle.

10. The steering rack support assembly of claim 7, wherein the at least one mounting member is configured to directly attach to the frame of the vehicle.

11. The steering rack support assembly of claim 7, wherein the cross section of the support shaft is circular.

12. The steering rack support assembly of claim 7, wherein the cross section of the support shaft is rectangular.

13. The steering rack support assembly of claim 7, wherein the cross section of the support shaft is elliptical.

14. An aftermarket steering rack support assembly configured to be coupled to a rack and pinion assembly, comprising:

a support shaft having a first end and a second end;

a first mounting member configured to be affixed to the first end of the support shaft and affixed to the rack and pinion assembly outward of a first billows, wherein the first billows is axially aligned with the rack and pinion assembly;

a second mounting member configured to be affixed to the second end of the support shaft and affixed to the rack and pinion assembly outward of a second billows, wherein the second billows is axially aligned with the rack and pinion assembly; and a sleeve disposed around an outer surface of the support shaft and slidably coupled to the support shaft, the sleeve having a bracket affixed to the sleeve, the bracket configured to couple to a rack and pinion assembly, a first tie rod, and a second tie rod, wherein when the steering rack support assembly is coupled to the rack and pinion assembly, the first tie rod and the second tie rod are configured to change a selected direction of motion of the vehicle in response to movement of the sleeve along the support shaft.

15. The steering rack support assembly of claim 14, further comprising the rack and pinion assembly, the first tie rod, and the second tie rod, wherein the first mounting member and the second mounting member are configured to directly attach to the rack and pinion assembly.

16. The steering rack support assembly of claim 14, wherein the first mounting member and the second mounting member are configured to directly attach to a sway bar of the vehicle.

17. The steering rack support assembly of claim 14, wherein the first mounting member and the second mounting member are configured to directly attach to the frame of the vehicle.

18. The steering rack support assembly of claim 14, wherein a cross section of the support shaft is circular.

19. The steering rack support assembly of claim 14, wherein a cross section of the support shaft is rectangular.

20. The steering rack support assembly of claim 14, wherein a cross section of the support shaft is elliptical.

* * * * *